United States Patent
Di et al.

(10) Patent No.: US 11,599,929 B2
(45) Date of Patent: Mar. 7, 2023

(54) FASHION PREFERENCE ANALYSIS

(71) Applicant: eBay Inc., San Jose, CA (US)

(72) Inventors: Wei Di, Cupertino, CA (US); Vignesh Jagadeesh, Santa Clara, CA (US); Robinson Piramuthu, Oakland, CA (US); Elizabeth Churchill, San Francisco, CA (US); Anurag Bhardwaj, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 17/102,194

(22) Filed: Nov. 23, 2020

(65) Prior Publication Data

US 2021/0166290 A1 Jun. 3, 2021

Related U.S. Application Data

(63) Continuation of application No. 16/009,626, filed on Jun. 15, 2018, now Pat. No. 10,878,481, which is a
(Continued)

(51) Int. Cl.
*G06Q 30/00* (2012.01)
*G06Q 30/0601* (2023.01)
*G06V 40/10* (2022.01)

(52) U.S. Cl.
CPC ......... *G06Q 30/0631* (2013.01); *G06V 40/10* (2022.01)

(58) Field of Classification Search
USPC .......................................... 705/26, 27, 4, 2
See application file for complete search history.

(56) References Cited

U.S. PATENT DOCUMENTS 8,068,676 B2 11/2011 Zhang et al.
8,660,902 B2 2/2014 Coulter
(Continued)

FOREIGN PATENT DOCUMENTS

CN 102968555 A 3/2013
CN 103440587 A 12/2013
(Continued)

OTHER PUBLICATIONS

Result of Consultation received for European Patent Application No. 15779536.0, mailed on May 19, 2021, 3 Pages.
(Continued)

*Primary Examiner* — Robert M Pond
(74) *Attorney, Agent, or Firm* — Holland & Hart LLP

(57) ABSTRACT

A machine is configured to determine fashion preferences of users and to provide item recommendations based on the fashion preferences. For example, the machine accesses an indication of a fashion style of a user. The fashion style is determined based on automatically captured data pertaining to the user. The machine identifies, based on the fashion style, one or more fashion items from an inventory of fashion items. The machine generates one or more selectable user interface elements for inclusion in a user interface. The one or more user interface elements correspond to the one or more fashion items. The machine causes generation and display of the user interface that includes the one or more selectable user interface elements. A selection of a selectable user interface element results in display of a combination of an image of a particular fashion item and an image of an item worn by the user.

15 Claims, 19 Drawing Sheets

Related U.S. Application Data continuation of application No. 14/326,125, filed on Jul. 8, 2014, now Pat. No. 10,013,710.

(60) Provisional application No. 61/981,011, filed on Apr. 17, 2014.

(56) References Cited

U.S. PATENT DOCUMENTS

| | | | |
|---|---|---|---|
| 8,908,928 | B1 | 12/2014 | Hansen |
| 9,213,420 | B2 | 12/2015 | Amacker et al. |
| 9,275,308 | B2* | 3/2016 | Szegedy ............... G06V 10/454 |
| 10,013,710 | B2 | 7/2018 | Di et al. |
| 10,878,481 | B2 | 12/2020 | Di et al. |
| 2001/0020222 | A1 | 9/2001 | Lee et al. |
| 2006/0020482 | A1* | 1/2006 | Coulter ............... G06Q 30/0601 |
| | | | 705/347 |
| 2008/0180448 | A1 | 7/2008 | Anguelov et al. |
| 2009/0116698 | A1 | 5/2009 | Zhang et al. |
| 2010/0111370 | A1 | 5/2010 | Black et al. |
| 2010/0313141 | A1 | 12/2010 | Yu et al. |
| 2011/0069888 | A1 | 3/2011 | Lim et al. |
| 2012/0308140 | A1 | 12/2012 | Ambrus et al. |
| 2013/0085893 | A1 | 4/2013 | Bhardwaj et al. |
| 2013/0249337 | A1 | 9/2013 | Kim et al. |
| 2013/0249937 | A1 | 9/2013 | Amacker et al. |
| 2015/0170002 | A1* | 6/2015 | Szegedy ............... G06V 10/454 |
| | | | 382/156 |
| 2015/0302505 | A1 | 10/2015 | Di et al. |
| 2018/0365750 | A1 | 12/2018 | Di et al. |

FOREIGN PATENT DOCUMENTS

| | | |
|---|---|---|
| CN | 103578008 A | 2/2014 |
| CN | 106462979 A | 2/2017 |
| KR | 10-2007-0035082 A | 3/2007 |
| KR | 10-2007-0057674 A | 6/2007 |
| KR | 10-2012-0085707 A | 8/2012 |
| KR | 10-2013-0038547 A | 4/2013 |
| KR | 10-2014-0028064 A | 3/2014 |
| WO | 2006/018482 A1 | 2/2006 |
| WO | 2010/141637 A1 | 12/2010 |
| WO | 2014/037939 A1 | 3/2014 |
| WO | 2015/161191 A1 | 10/2015 |

OTHER PUBLICATIONS

Office Action Received for Korean Patent Application No. 10-2020-7034889, dated Jul. 26, 2021, 10 pages (5 Pages of English Translation & 5 Pages of Official Copy).
Summons to Attend Oral Proceeding Received for European Patent Application No. 15779536.0, mailed on Jun. 10, 2021, 16 Pages.
Fukunaga, "Introduction to Statistical Pattern Recognition", 1990, 616 Pages.
Shin et al., "Preference and Wearing Frequency of Knit-Wears Related to Self-Image", The Research Journal of the Costume Culture), vol. 16, No. 3 (published in Jun. 2008), 15 Pages.
Final Office Action received for Korean Patent Application No. 10-2016-7032017, dated Jul. 31, 2018, 8 pages (4 pages of Official Copy and 4 pages of English Translation).
Final Office Action received for Korean Patent Application No. 10-2016-7032017, dated Nov. 1, 2018, 9 pages (4 pages of English Translation and 5 pages of Official Copy).
Office Action received for Korean Application No. 10-2016-7032017, dated Dec. 31, 2017, 13 pages (5 pages of English Translation and 8 pages of Official Copy).
Office Action received for Korean Patent Application No. 10-2016-7032017, dated Mar. 13, 2017, 14 pages (8 pages of Official copy and 6 pages of English Translation).
Notice of Allowance received for Korean Patent Application No. 10-2018-7037225, dated Sep. 4, 2020, 5 pages (2 pages of English Translation and 3 pages of official copy).
Office Action received for Korean Patent Application No. 10-2018-7037225, dated Mar. 19, 2019, 14 pages (8 Pages of Official Copy and 6 pages of English Translation).
Office Action received for Korean Patent Application No. 10-2018-7037225, dated Sep. 23, 2019, 5 pages (2 pages of Official Copy and 3 pages of English Translation).
Final Office Action received for U.S. Appl. No. 14/326,125, dated Sep. 22, 2017, 28 pages.
Non-Final Office Action received for U.S. Appl. No. 14/326,125, dated May 19, 2017, 17 pages.
Notice of Allowance received for U.S. Appl. No. 14/326,125, dated Mar. 5, 2018, 8 pages.
Communication to Article 94(3) EPC for European Patent Application No. 15779536.0 dated Sep. 18, 2019, 8 pages.
Extended European Search report received for European Patent Application No. 15779536.0, dated Jul. 24, 2017, 9 pages.
Non Final Office Action Received for U.S. Appl. No. 16/009,626, dated Apr. 30, 2020,28 Pages.
Notice Of Allowance received for U.S. Appl. No. 16/009,626, dated Aug. 24, 2020, 9 Pages.
Notice of Decision to Grant Received for Chinese Patent Application No. 201580026270.2, dated Sep. 4, 2019, 6 pages (4 pages of Official Copy and 2 pages of English Translation).
Office Action received for Chinese patent Application No. 201580026270.2, dated May 22, 2019, 6 pages (3 pages of English Translation and 3 pages of Official Copy).
Office Action received for Chinese Patent Application No. 201580026270.2, dated Sep. 3, 2018, 13 pages (8 pages of Official copy and 5 pages of English Translation).
Anoymous Submission, "Fashion Watch: Inferring Fashion Style and Preference from Everyday Movements", Paper ID: 705 Paper CHI 2014, 2014, pp. 1-10.
Di et al., "System and Method for Understanding Fashion Tastes from Live Camera Feeds / Social Network Images without Explicit Interactions", 2013, 2 pages.
Grauman et al., "Inferring 3D structure with a statistical image-based shape model", IEEE International Conference on Computer Vision, 2003, pp. 641-648.
Liu et al., "Clothing similarity computation based on TLAC", International Journal of Clothing Science and Technology 24.4: 273-286. Emerald Group Publishing Limited., (2012) Dialog #1029895078, 15pgs. (Year: 2012), 2012, 15 Pages.
International Preliminary Report on Patentability received for PCT Application No. PCT/US2015/026361, dated Oct. 27, 2016, 9 pages.
International Search Report received for PCT Application No. PCT/US2015/026361, dated Jul. 28, 2015, 2 pages.
International Written Opinion received for PCT Patent Application No. PCT/US2015/026361, dated Jul. 28, 2015, 7 pages.
Spanlang, "Garment Modelling and Visualization", Global Proquest Dissertations, Sep. 23, 2005, 220 pages.
Trial Board Decision received for Korean Patent Application No. 10-2018-7037225, mailed on Aug. 21, 2020, 39 pages (22 pages of English translation and 17 pages of official copy).
Final Office Action received for Korean Patent Application No. 10-2020-7034889, dated Jan. 21, 2022, 6 pages (3pages of English translation and 3 pages of official copy).
Office Action received for Korean Patent Application No. 10-2020-7034889, dated Jan. 21, 2021, 7 pages (1 page of English translation and 6 pages of official copy).
Notice of Allowance received for Korean Patent Application No. 10-2020-7034889, dated Apr. 25, 2022, 4 Pages (2 Pages of Official Copy Only & 2 Pages of English Translation).

* cited by examiner

FASHION PREFERENCE ANALYSIS

CLAIM OF PRIORITY

This application is a continuation of U.S. application Ser. No. 14/326,125, filed Jul. 8, 2014, which claims the benefit of priority of U.S. Provisional Patent Application No. 61/981,011, filed Apr. 17, 2014, each of which is hereby incorporated by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2014, All Rights Reserved.

TECHNICAL FIELD

The subject matter disclosed herein generally relates to the processing of data. Specifically, the present disclosure addresses systems and methods to determine fashion preferences of users and to provide item recommendations to the users based on the users' fashion preferences.

BACKGROUND

Online commerce has changed the way people shop. Many people purchase a variety of products from online stores, such as electronics, groceries, books, and cars. One of the most impressive success stories of online commerce is the fashion apparel segment. This may be attributed at least in part to the variety of fashion choices afforded by large-scale inventories at competitive prices. However, with the advantages offered by hosting large scale fashion inventories, comes the need to facilitate effective interactions by users with millions of item listings. Many of the existing e-commerce sites utilize text-based search engines that help identify the products most related to the query.

BRIEF DESCRIPTION OF THE DRAWINGS

Some embodiments are illustrated by way of example and not limitation in the figures of the accompanying drawings.

DETAILED DESCRIPTION

Figure 1:
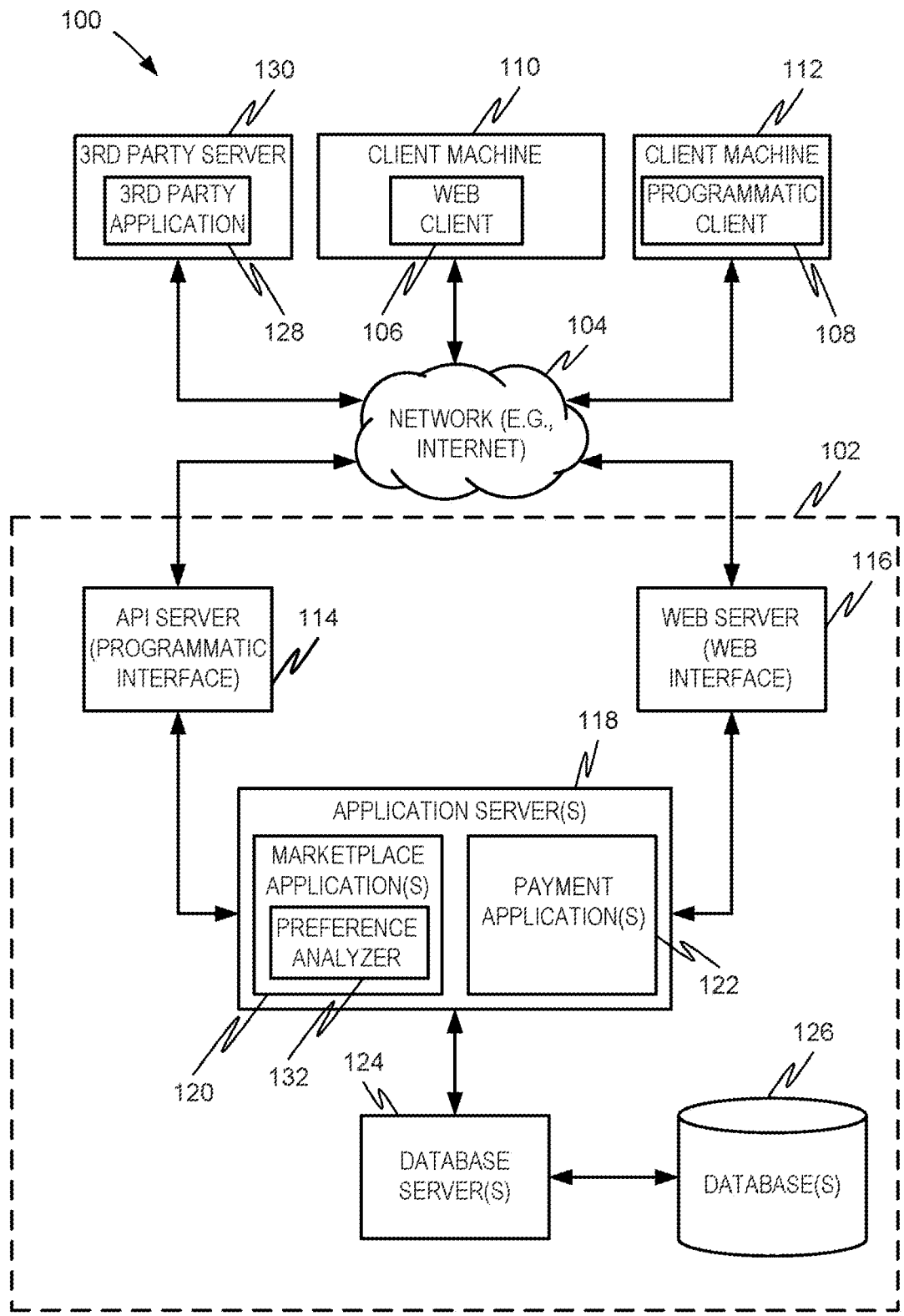
FIG. 1 is a network diagram depicting a client-server system, within which some example embodiments may be deployed.

Example methods and systems for facilitating the determining of fashion preferences of users and for providing item recommendations to the users based on the fashion preferences of the users are described. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Since its inception, online shopping has proven to be an effective mechanism to provide users with a greater selection of merchandise, at competitive prices. As more commerce entities obtain an online presence, the volume of merchandise available online increases dramatically. As a result, shoppers may find it more difficult to quickly search and identify items that meet their search criteria.

Generally, when initiating an online search for an item using a search engine, a user enters a text query into a user interface. Users may face a couple of major pain points while searching for fashion items with text. First, because of the difficulties in understanding the semantic aspect of long sentence queries, the use of long query phrases (e.g., "blue striped half sleeve shirt with low cut collar") may result in poor performance of many state of the art text search engines. Second, fashion is predominantly concerned with visual aesthetics that are often bypassed by text search engines. Recent attempts have been made to facilitate searches for items using image queries. However, such attempts often do not result in better, more relevant search results. An image search alone that is not customized to account for the fashion tastes, shapes (or body structures or body dimensions), preferred colors, patterns, styles, or brand of the users may produce numerous search results that are irrelevant to the user.

Recent developments in virtual fitting rooms have addressed some aspects of determining the body structure a user. However, many virtual fitting room systems may not attempt to understand user style or fashion preferences. Further, many virtual fitting room systems may not be suitable for studying natural fashion styles of users since the trips to virtual fitting rooms are usually artificial, one-time occurrences that may not allow for the continuous observation of users' fashion choices over extended periods of time.

In some example embodiments, a preference analysis system may determine the fashion preferences of a user and provide item recommendations based on the fashion preferences of the user. The preference analysis system may, according to certain example embodiments, collect visual and spatial data descriptive of the user in the user's natural environment (e.g., a living room or an office space) over a period time, may determine one or more fashion preferences of the user based on the collected visual and spatial data, may identify one or more fashion items (e.g., apparel, footwear, or accessories) that conform to the user's fashion preferences, and may recommend the identified one or more fashion items to the user. By facilitating, in some example embodiments, implicit interactions by the user with the preference analysis system without requesting the user to stand in certain predetermined positions with respect to a device (e.g., a camera or a sensor) that collects the visual and spatial data, the preference analysis system may provide a more user-friendly and time-saving mechanism of learning about the user's fashion tastes and may provide relevant recommendations of fashion items that are similar to or may be coordinated with the wardrobe items of the user.

In some example embodiments, the visual and spatial data is collected using imaging technology, such as that implemented in red, green, blue, and depth (hereinafter, "RGB-D") sensors. Examples of products that use depth sensing technology are the Microsoft™ XBOX 360® and XBOX One. Typical RGB images are obtained by projecting a three-dimensional (hereinafter, "3D") scene onto a two-dimensional (hereinafter, "2D") sensor, thus losing all information about depth. Because the RGB-D sensors provide depth data, new technology advancements are possible in the fields of motion capture and human body modeling. Furthermore, because the RGB-D data may be captured as video streams in which the user exhibits complex motions, the preference analysis system may obtain detailed information about apparel being worn on different parts of the body and about the body of the user (e.g., layout, shape, or measurements).

According to some example embodiments, the dataset used by the preference analysis system to determine the user's fashion preferences has three main sources of information in the form of a 3-tuple: the RGB channel, the depth channel, and a human stick figure (e.g., generated based on the data captured by the depth sensor). The RGB-D dataset may be denoted by $\{I_n, D_n, S_n\}_{n=0}^N$. A query image, that in some instances is used to perform a search of a fashion inventory based on the user's fashion preferences, may be denoted by $\{I_q, D_q, S_q\}$. The triple variables stand for the RGB image, Depth image and Skeleton array (e.g., identifiers of skeleton joints) respectively. Humans in RGB-D images can be represented using a skeleton made up of a fixed number of bone joints, for example, P joints. In other words, $S_n=\{x_{1n}, x_{2n} \ldots x_{Pn}\}$ comprises P three-dimensional coordinates corresponding to the location of each bone joint. It may be further assumed that there are a set of R items of apparel or accessories (e.g., a hat, sunglasses, a t-shirt, a watch, a shoe, an item of jewelry, a bag, etc.) denoted by $\{A_r\}_{r=1}^R$.

There is a variety of useful information that may be determined based on observing the user in motion. Examples of such information are the body dimensions and clothing styles of the user. The determining of the user's body measurements may help customize the search for correctly sized clothing for the particular user. Generally, many users hesitate to discuss their body sizes or provide body dimension information to anyone (e.g., e-commerce operators). Users also may find it hard to continually keep track of their body measurements over time. The preference analysis system may addresses this issue by determining the user's body measurements without asking explicit questions, and without issuing instructions to pose for measurements.

Advances in imaging sensors and algorithms may, in some example embodiments, allow the preference analysis system to determine precise body dimensions for a number of body parts. Denoting the 2D image pixel coordinates of a point by x={x, y} and its corresponding location in the 3D world by X=[X, Y, Z], the two representations may be related by the projection matrix, x=PX. Based on image pixel coordinates, the preference analysis system may recover X, Y accurately using the projection matrix, while Z may be recovered up to a scale factor. However, the depth channel of the depth (e.g., Kinect) sensor may provide the preference analysis system with the explicit depth values resolving the ambiguity in Z. Once the preference analysis system has access to the 3D coordinates of the body joints of the user, the preference analysis system may measure the user's body dimensions. Using the primitive of joint distances $d_M$ in 3D on the human body manifold M, $$jtDist3D(i,j)=d_M(X_i-X_j), \quad 1 \leq i,j \leq P. \qquad (1)$$

In some example embodiments, the preference analysis system may project every pixel on the person's body into a 3D space yielding a full 3D model of the person after fitting a mesh to the 3D points. In certain example embodiments, the preference analysis system may generate the model of the person based on the joint locations in the 3D space. The body measurements estimated from a flat 2D image lack a sense of depth. The depth sensors may help the preference analysis system to overcome this issue by explicitly offering a depth channel for every pixel in the color image. Since the 3D world has been projected onto a 2D imaging sensor, the projection process may be reversed to recover the true 3D coordinates, using $$P = \begin{pmatrix} f_x & 0 & s_x \\ 0 & f_y & s_y \\ 0 & 0 & 1 \end{pmatrix},$$

where $(f_x, f_y)$, $(s_x, s_y)$ are x–y camera focal lengths and principal offsets.

Figure 6:
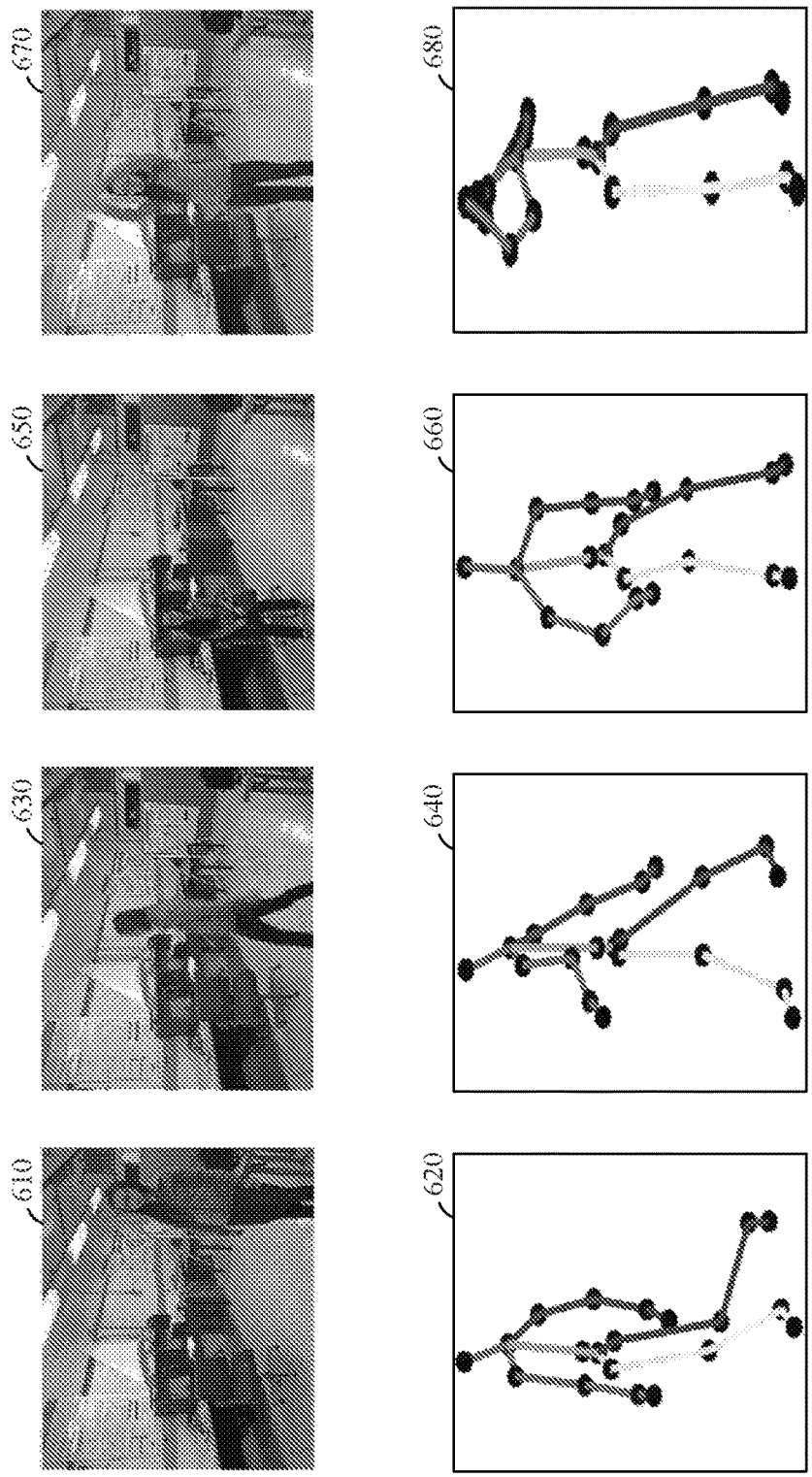
FIG. 6 is a diagram illustrating example images depicting a user at different points in time and corresponding example models representing the body of the user at the different points in time, according to some example embodiments.

Once the body locations corresponding to different body joints have been localized using $\{S_n\}_{n=0}^N$, in some example embodiments, the next step may be to extract pixels for every body part on which apparel or other fashion items could be worn. In some instances, a number of body parts may be localized: the face (e.g., where glasses may be worn), the torso (e.g., where shirt, tops, t-shirts, or blazers may be worn), right/left hand (e.g., where watches or bracelets may be worn), the right or the left leg (e.g., where trousers, shorts or skirts may be worn), or the right or the left foot (e.g., where boots, shoes, or sandals may be worn). These body parts of interest, are inherently composed of body part joints, as illustrated in FIG. 6 below. For instance, the torso body part $B_{torso}=\{1,2\}$ is made up of two joint detected on the chest $x_{2i}$ and bellybutton $x_{1i}$. Example relationships between certain body parts and their constituent joints are illustrated in Table 1, shown below.

TABLE 1

Tabulation of the relationships between the body parts and their constituent joints as returned by a pose estimation API in the Kinect sensor.

| Body Part | Constituent Joints |
|---|---|
| Face | Forehead, Chin |
| Torso | Chest, Bellybutton |
| Lower Hand | Wrist, Inner Hand |
| Upper Hand | Shoulder, Elbow |
| Leg | Hip, Knee |
| Foot | Ankle, Feet |

In some example embodiments, an image patch (e.g., swatch or region) that corresponds to a portion of a particular body part (e.g., the torso) of the representation of the user within the image may be extracted from the image. If it is assumed that a certain body part is made up on L joints, then the center of an image swatch and the size of the image swatch may be calculated using the following formulas:

$$\text{Swatch Center} = \frac{\sum_{i \in B_{torso}} x_{in}}{|B_{torso}|} \text{ and}$$

$$\text{Swatch Dimension} = 1.5 \times max_{i,j} \|x_{in} - x_{jn}\|_2. \quad (2)$$

In other words, according to some example embodiments, the procedure for extracting an image swatch from the image of the user includes cropping a square box of dimension "Swatch Dimension", centered at the point "Swatch Center".

Once the regions of interest corresponding to different body parts have been cropped out from the image, they may be described using a suitable visual descriptor. A visual descriptor may be the color descriptor in "Hues, Saturation, and Value" (also "HSV") color space. The pixels belonging to each body part are represented by a set of real numbers that are representative of the color contained in the cropped patch. The preference analysis system may utilize a non-uniform binning strategy that creates 24 bins for the H channel, 8 bins for the S channel, and 8 bins for the V channel. In addition to color features, the preference analysis system may also employ a gray scale histogram comprised of 8 bins leading to a visual descriptor made up of 48 real numbers. The visual descriptor associated with the $i^{th}$ body part in the $j^{th}$ image may be denoted by the swatch $v_{ij}$. In some example embodiments, in addition to or instead of a color-based descriptor, the preference analysis system utilizes one or more other types of descriptors (e.g., a texture-based descriptor, a shape-based descriptor, etc.).

In some instances, the process of determining user fashion preferences and of identifying fashion items compatible with the user's fashion preferences includes estimating the compatibility between a certain pose and a fashion (e.g., apparel) item.

TABLE 2

Matrix I captures the co-occurrence between poses and fashion items. Here, nine fashion items are denoted by A1 to A9 and seven poses are denoted by P1 to P7.

| | A1 | A2 | A3 | A4 | A5 | A6 | A7 | A8 | A9 |
|---|---|---|---|---|---|---|---|---|---|
| P1 | | | | 1 | | | | | |
| P2 | 1 | | 1 | | | | | | 1 |
| P3 | | 1 | | | | 1 | 1 | | |
| P4 | | | | | 1 | | | | 1 |
| P5 | 1 | | | | | 1 | | | |
| P6 | | | 1 | | 1 | | 1 | | |
| P7 | | 1 | | | 1 | | | | |

The matrix I, illustrated in Table 2 above, is a boolean matrix (e.g., every entry is either 1 or 0). The rows (i) correspond to different postures and columns (j) to different apparel (or other fashion) items. If a certain apparel item j can be reliably extracted from a posture i, then $I(i,j)=1$. Alternatively, if a certain apparel item j cannot be reliably extracted from a posture i, then $I(i,j)=0$. The postures estimated by the depth (e.g., Kinect) sensor may have great variability between them. An example is the contrast between a user facing the camera with hands up in the air, and a user facing the camera through a side view. In order for the preference analysis system to understand (e.g., determine) the posture a person is currently situated in, the preference analysis system may employ pose clustering. To this end, the preference analysis system may create a pose descriptor from a human skeleton figure shown in FIG. 6. If the pose descriptor for the $i^t h$ subject is denoted by Pn, then the pose descriptor is the angle between joint locations $$P_n(j,k) = \angle x_{jn}, x_{kn}. \quad (3)$$

Since the matrix Pn is symmetric, the upper triangular portion of the matrix may be vectorized to form the pose descriptor. In other words, every pose descriptor is a set of $$\frac{P(P-1)}{2}$$

real numbers concatenated together. These descriptors are part of a feature space describing postures users could be in. A clustering procedure may allow the grouping of similar poses together and the differentiating of the similar poses from other, dissimilar poses. In some example embodiments, the preference analysis system groups cluster items (e.g., items that may form a cluster) into a particular cluster based on one or more clustering rules. For example, a first clustering rule specifies that a cluster may be formed based on cluster items of the same type. In certain example embodiments, as a result of applying the first clustering rule, the preference analysis system may generate a first cluster that groups images of one or more users, a second cluster that groups models (e.g., stick figures) of one or more users, and a third cluster that groups combinations of an image and a model.

In another example, a second clustering rule specifies that cluster items may be grouped together into a particular cluster based on the cluster items depicting similar poses of the user(s). The grouping of cluster items into particular clusters based on a particular pose (or similar poses) may facilitate the identifying of areas (e.g., in the images or models) that correspond to unobstructed body parts of the user depicted in the images or models. The grouping of cluster items into particular clusters based on a particular pose (or similar poses) may further facilitate the performing of a more accurate analysis of the areas in the images or models that correspond to the unobstructed body parts. One or more cluster items included in a cluster may be used to analyze particular areas that correspond to the unobstructed body parts of the user depicted in the cluster items included in the cluster.

Figure 11:
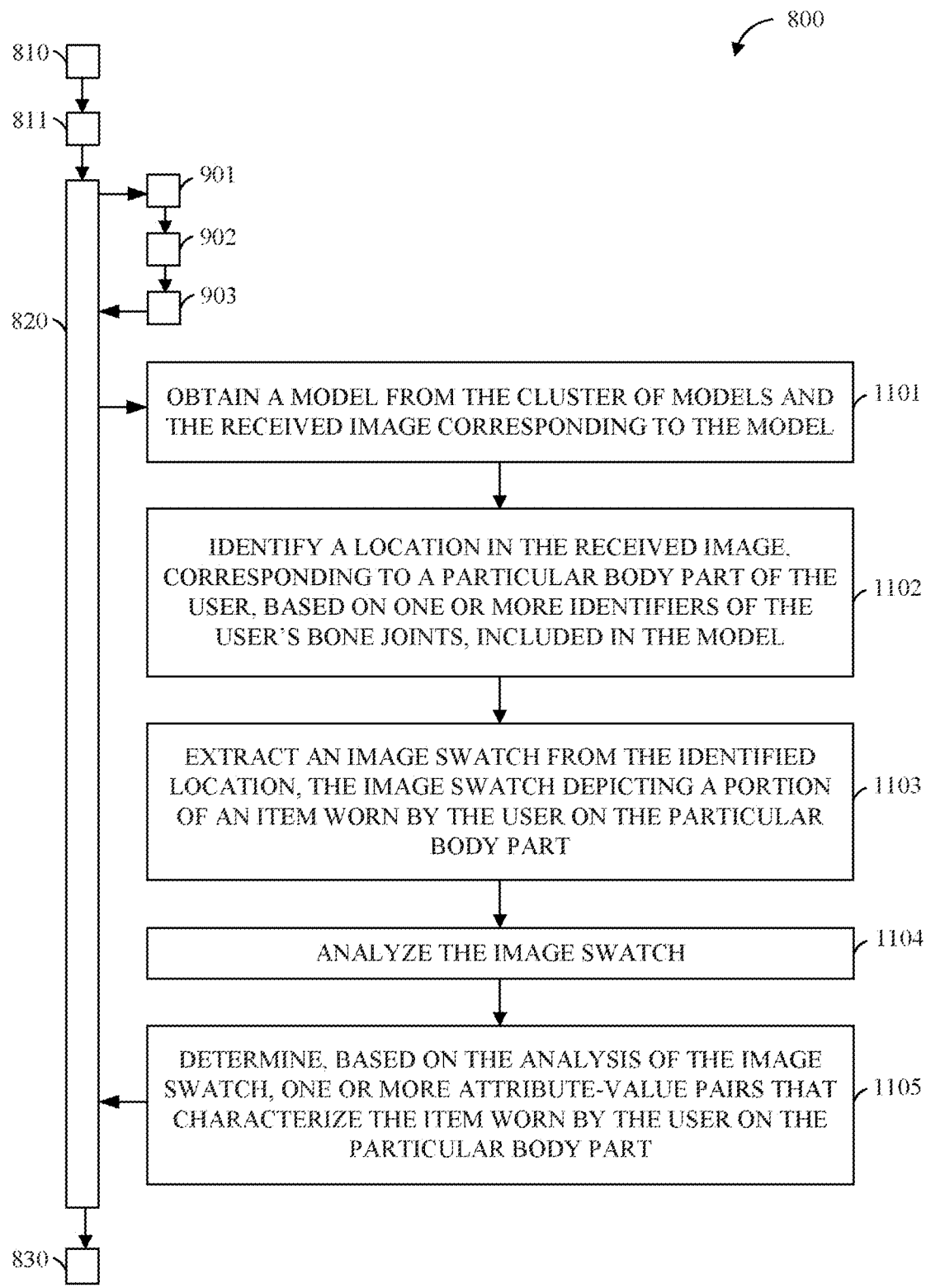
FIG. 11 is a flowchart illustrating operations of the preference analysis machine in performing a method of determining fashion preferences of a user, according to some example embodiments.

According to one example, the clustering procedure groups all images illustrating postures of a user facing the camera with the user's arms stretched upwards, into a first cluster. According to another example, the images of postures of the user having the user's hands in front of the user are grouped into a second cluster, distinct from the first cluster. This scenario is shown in FIG. 11.

The clustering procedure can be described using the following formula:

$$\arg\min_S \sum_{i=1}^{K} \sum_{P_j \in S_i} \|P_j - \mu_i\|^2, \quad (4)$$

where K is the number of pose clusters to be analyzed, and $S_i$, $1 \le i \le K$ is the set of clusters, each containing a subset or partitioning of the entire space of postures users are present in. The pose clustering may reduce a large number of data points (equal to the number of video frames captures) to a compact set of exemplar posture signatures $\mu_i$, $1 \le i \le K$, where each signature is a representative example from each cluster. Examples of postures grouped together in clusters are images that depict a frontal view of the user, images that depict a side view of the user, images that depict the user having the user's arms raised up, images that depict a hand in front of the user's torso, or images that depict a sitting user.

The pose clustering may be used because the quality of extracted image swatches may depend on the particular posture of the user. If a particular body part of the user is located further away from the camera in relation to other body parts of the user, or is obstructed by another body part or another object in the room, an image swatch of the particular body part may not include sufficient information for determining a user preference with respect to items worn on the particular body part. For instance, if the user wears a watch on the user's left wrist and the user's right side of the body faces the camera, attempting to extract an image swatch depicting the user's watch on his left wrist may not result in a good quality image swatch. Similarly, an attempt to extract information about the user's shirt when the user has the user's arms folded in front of the user's torso may not be successful because the preference analysis system may erroneously sample pixels belonging to the representation of the user's arm or hand within the image instead of the pixels belonging to the representation of the shirt.

In certain example embodiments, the preference analysis system evaluates the accuracy of the extracted swatches. The accuracy of an extracted image swatch may be assessed based on how well the extracted image swatch represents (e.g., depicts or illustrates) the body part of interest. As part of the process of extracting an image swatch, the preference analysis system superimposes a bounding box on an image at a location (e.g., an area or a region) within the image that represents the body part of interest. If the bounding box frames a portion of the representation of the body part of interest, a high score may be associated with the image swatch (e.g., as metadata of the image swatch). If the bounding box fails to enclose a portion of the representation of the body part, a low score is associated with the image swatch. In some instances, only highly reliable swatches are stored in a record of a database and are used for further analyses.

In some example embodiments, the preference analysis system tailors a search of an inventory of fashion items based on user preferences for particular fashion items (or characteristics of fashion items, such as style, color or pattern) and the user's measurements. A focused searched customized for a particular user may eliminate frictions within a shopping process, provide relevant recommendations of fashion items, and increase sales of the recommended items.

Observing user activity may help in customizing searches to the preferences of a specific user. In some example embodiments, once the image swatches are extracted from one or more images of the observed user, the preference analysis system may perform a search of fashion items within an inventory of fashion items to generate search results suitable for recommending to the user, based on the user's measurements and fashion preferences. In some instances, the searching of the inventory of fashion items includes comparing a query swatch (e.g., an image swatch extracted from a received image of the user) with a different image that depicts a fashion item included in the inventory of fashion items.

In some example embodiments, the preference analysis system performs a similarity search of an inventory of fashion items based on the extracted image swatch. The performing of the similarity search may include identifying, within the fashion inventory, a fashion item that matches the extracted image swatch as closely as possible, for example, based on matching visual features in the image swatch extracted from the received image and visual features in a different image that depicts an fashion item in the inventory of fashion items.

According to certain example embodiments, given a query swatch extracted from the image of the user, $v_{ij}^{query}$, the preference analysis system searches for a visually similar item in the inventory of fashion items (e.g., the fashion items for sale on an e-commerce sites). It may be assumed that the inventory is made up of $U = \{(U^{glass}, U^{shoes}, U^{shirt}, \ldots, U^{trouser}\}$. The inventory dataset may be comprised of visual features corresponding to various fashion items, such as glasses, shirts, shoes, trousers, etc. In some instances, a result of a similarity search may be determined based on a nearest neighbor match and may include one or more items most similar to the query swatch. For example, an inventory item may be identified as being most similar to the query swatch based on the inventory item having a number (or a percentage) of visual features in common with the query swatch. In some instances, the inventory item is identified as being most similar to the query swatch based on the inventory item having a number (or a percentage) of visual features in common with the query swatch that exceeds a particular threshold value.

In some example embodiments, the preference analysis system performs a coordination search of an inventory of fashion items based on the extracted image swatch. The performing of the coordination search may include identifying, within the inventory of fashion items, a fashion item that may be worn together with an item previously worn by the user, based on a coordination rule. In some instances, one or more coordination rules describing one or more fashion preferences of the user may be generated based on analyzing the fashion choices previously made by the user (e.g., items previously worn together, items previously purchased by the user, following certain recommendations of fashion items, etc.). In some example embodiments, in addition to or instead of applying one or more coordination rules describing one or more fashion preferences of the user to perform the coordination search, the preference analysis system utilizes one or more coordination rules determined by fashion experts, or one or more coordination rules machine-learnt from data that describes fashion preferences (e.g., fashion preference patterns) of a plurality of people (e.g., buyers, designers, fashion bloggers, fashion experts, fashion models, people exhibiting street styles, etc.).

According to certain example embodiments, given a query apparel (e.g., a shirt query) and a target apparel item (e.g., trousers that go well with the shirt), a coordination transformation may be first determined between query and target spaces denoted by $T_{query \to target}$. In such a scenario, once a query swatch with visual signature $v_{ij}^{query}$ is extracted (e.g., from the image of the query apparel), the preference analysis system may transform the query into target space (e.g., color/pattern space for trousers). This transformation may be performed based on the following formula:

$$v_{ij}^{target} = T_{query \to target} v_{ij}^{query}. \quad (5)$$

Once the target visual signature is computed, the preference analysis system may perform a similarity search on the target space based on a visual search described above. It may be useful to note that, given a shirt query, a visual search during a similarity search may be performed over the query space such that similar shirt items are identified as search results. In contrast, during a coordination search, the preference analysis system may first transform the visual signature from query space to a target space (e.g., trousers) and then perform the final search over the target space.

In some example embodiments, upon performing a similarity search or a coordination search, the preference analysis system generates a recommendation that includes one or more results of the similarity search or of the coordination search. The recommendation may be transmitted in a communication to the user.

According to certain example embodiments, the preference analysis system may analyze a user's fashion preferences and may estimate dimensions of the user's body parts regardless of the user's pose or viewpoint from the camera. The capturing of the user's image and spatial data that describes the body and pose of the user within the 3D space may take place within the user's home, office environment, or even a public space.

For example, a large public display is a popular medium for interacting with shoppers in malls and other public locations. Large displays invariably invoke curiosity among users, and sustaining user involvement over longer periods of time may be important to the success of these displays. Such a display may include a camera (of the preference analysis system) to capture user images and spatial data describing the user's body and pose(s). Once a user walks by such a display, the camera may capture the images of the user and the spatial data and the preference analysis system may determine the user's body dimensions, characteristics of the user's apparel (e.g., a clothing style), or both, based on the user's images and the spatial data describing the user's body and pose(s). Based on the user's body dimensions, characteristics of the user's apparel, or both, the preference analysis system may begin making recommendations to the user right away.

Moreover, in some instances, the recommendations may be augmented to impress the user. According to one example, if the search for fashion items to be recommended to the user is being performed in the month of December, Christmas outfits that suit the user may be recommended to the user while the user is located in front of the public display. If the search query is being performed during a sporting event (e.g., the Super Bowl), the preference analysis system may recommend clothing representing the competing teams. According to another example, the preference analysis system may recommend fashion items to a person playing a video game, in accordance with one or more themes (or characters) of the video game. According to yet another example, the preference analysis system may recommend clothing to a user watching a television show, according to the particular show being watched, characters appearing in the show, or actors starring in the show. For instance, the preference analysis system may build computational models of clothing styles based on currently popular celebrities. The preference analysis system may recommend fashion items based on the show being played and the computational models of clothing styles of the celebrities appearing in the particular show.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)), to one or more clients. FIG. 1 illustrates, for example, a web client 106 (e.g., a browser, such as the Internet Explorer browser developed by Microsoft Corporation of Redmond, Wash. State) and a programmatic client 108 executing on respective devices 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. In various example embodiments, the marketplace applications 120 may include a preference analyzer 132. The preference analyzer 132, in some example embodiments, may determine the fashion preferences of users and may generate item recommendations based on the users' fashion preferences.

The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
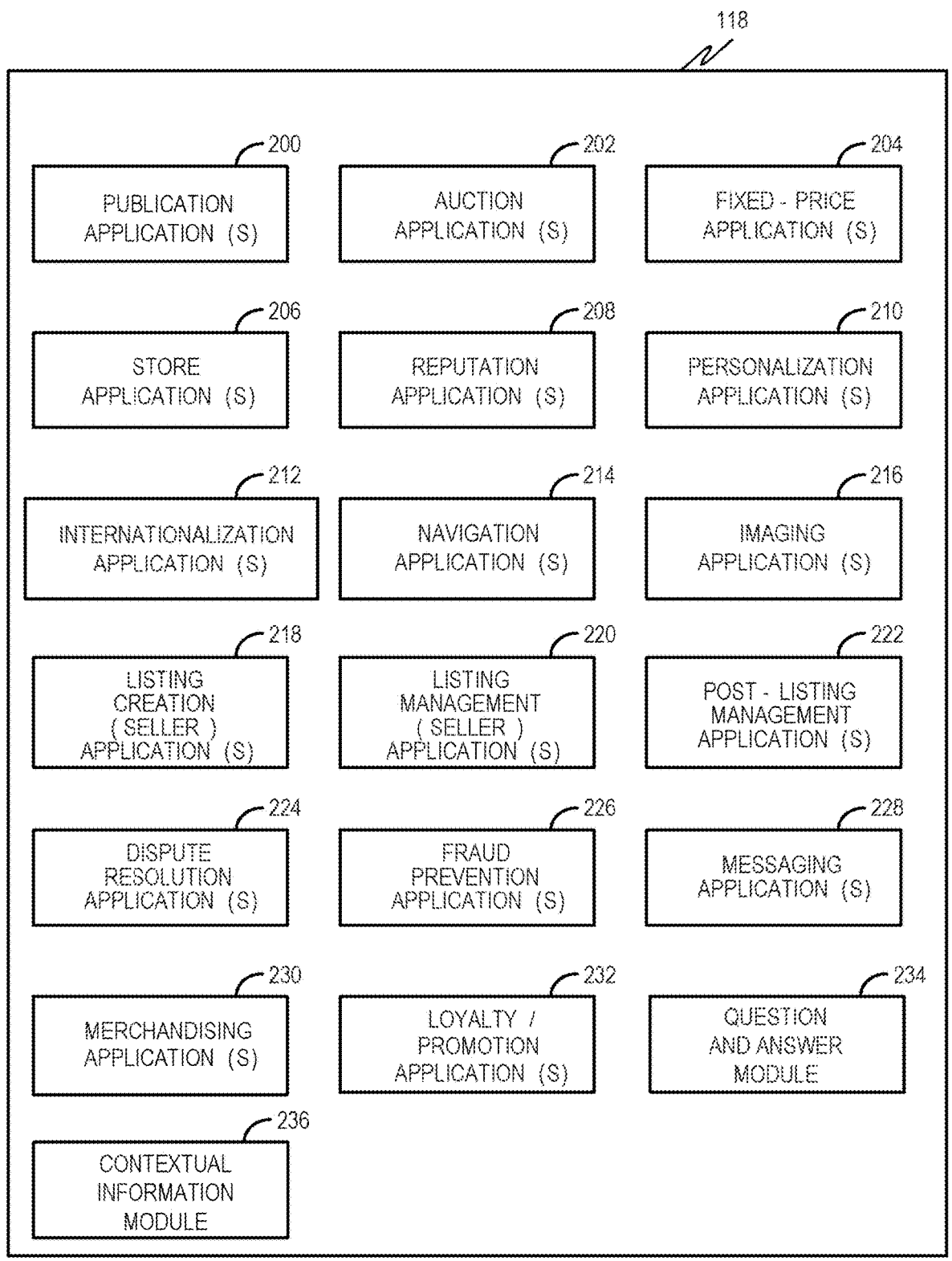
FIG. 2 is a block diagram illustrating marketplace and payment applications and that, in some example embodiments, are provided as part of application server(s) 118 in the networked system.

FIG. 2 is a block diagram illustrating marketplace and payment applications 120 and 122 that, in one example embodiment, are provided as part of application server(s) 118 in the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions, etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 212 that customize information (and/or the presentation of information by the networked system 102) according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make listings available via the networked system 102 as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102 (such as, for example, messages advising users regarding the status of listings at the networked system 102 (e.g., providing "outbid" notices to bidders during an auction process or to provide promotional and merchandising information to users)). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks 104.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

Figure 3:
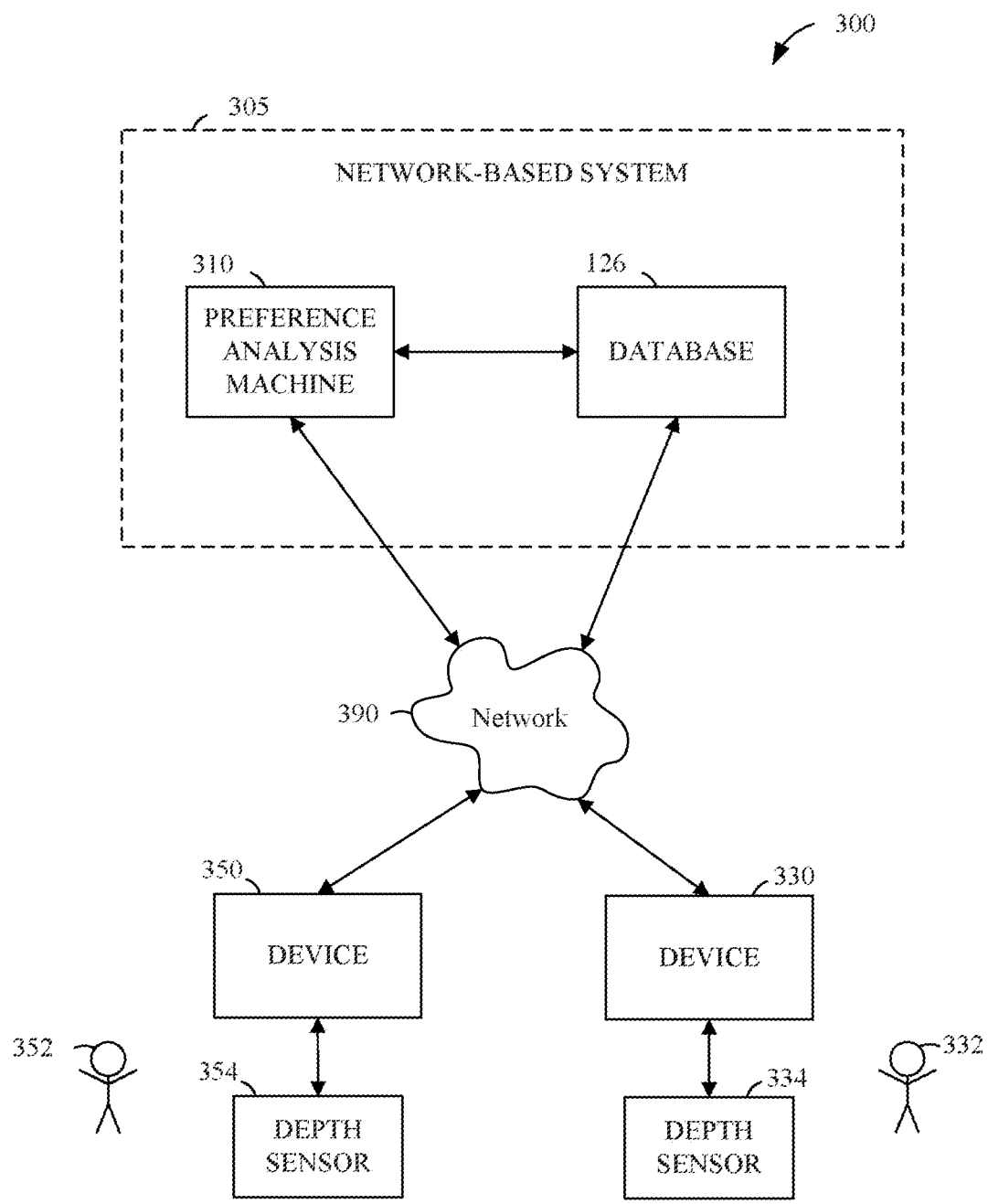
FIG. 3 is a network diagram illustrating a network environment suitable for analysis of fashion preferences, according to some example embodiments.

FIG. 3 is a network diagram illustrating a network environment 300 suitable for analysis of user fashion preferences, according to some example embodiments. The network environment 300 includes a preference analysis machine 310 (e.g., the preference analyzer 132), a database 126, and devices 330 and 350, all communicatively coupled to each other via a network 390. The preference analysis machine 310, with or without the database 126, may form all or part of a network-based system 305 (e.g., a cloud-based server system configured to provide one or more image processing services to the devices 330 and 350). One or both of the devices 330 and 350 may include a camera that allows capture of an image (e.g., an image of a user in a living room) or of depth (or spatial) data descriptive of the environment external to the camera, or both. One or both of the devices 330 and 350 may facilitate the communication of the image, the spatial data, or both, (e.g., as a submission to the database 126) to the preference analysis machine 310. The preference analysis machine 310 and the devices 330 and 350 may each be implemented in a computer system, in whole or in part, as described below with respect to FIG. 18.

Also shown in FIG. 3 are users 332 and 352. One or both of the users 332 and 352 may be a human user (e.g., a human being), a machine user (e.g., a computer configured by a software program to interact with the device 330), or any suitable combination thereof (e.g., a human assisted by a machine or a machine supervised by a human). The user 332 is not part of the network environment 300, but is associated with the device 330 and may be a user of the device 330. For example, the device 330 may be a desktop computer, a vehicle computer, a tablet computer, a navigational device, a portable media device, a smartphone, or a wearable device (e.g., a smart watch or smart glasses) belonging to the user 332. Likewise, the user 352 is not part of the network environment 300, but is associated with the device 350. As an example, the device 350 may be a desktop computer, a vehicle computer, a tablet computer, a navigational device, a portable media device, a smartphone, or a wearable device (e.g., a smart watch or smart glasses) belonging to the user 352.

Also shown in FIG. 3 are the depth sensors 334 and 354 (e.g., the Microsoft™ Kinect™, hereinafter, "Kinect", a mobile device, such as a cell phone, tablet, or PDA; or a camera; hereinafter, also "depth sensor(s)"). The network environment 300 may include one or more depth sensors. In some example embodiments, the depth sensor 334 may be part of the device 330. In other example embodiments, the depth sensor 334 may be external to the device 330. Similarly, the depth sensor 354 may be part of the device 350. In other example embodiments, the depth sensor 354 may be external to the device 350.

Each of the depth sensors 334 and 354 may capture (e.g., receive, gather, or collect) spatial data about the physical space external to the depth sensor (e.g., spatial data about user 332) and transmit the captured spatial data to the device 330 or the device 350, which in turn may transmit some or all of the spatial data captured by the depth sensors 334 and 354 to the preference analysis machine 310 via network 390. In some example embodiments, the depth sensors 334 and 354 may communicate with and send the captured spatial data to the preference analysis machine 310 via network 390 without first sending the spatial data to either of the devices 330 or 350.

In some example embodiments, the depth sensors 334 and 354 are absent from the network environment 300. The device 330 or the device 350 may capture images of the user 332 or the user 352, respectively, and may transmit the images to the preference analysis machine 310, via the network 390, for determination of user fashion preferences based on the captured images. For example, if the depth channel is not present, the preference analysis machine 310 may utilize the RGB channel data to determine the fashion preferences of the user(s).

In some example embodiments, some or all of the functionality of the preference analysis machine 310 is performed by the device 330 or the device 350. For example, an application hosted on the device 330 (e.g., an app stored on a smartphone) may perform an analysis of the image data and/or spatial data received from the camera of the device 330 or the depth sensor 334. The received image data and/or received spatial data may describe the items worn by the user 332 and the body of the user 332. The application hosted on the device 330 may, in some instances, determine one or more fashion preferences of the user 332. In some instances, the application hosted on the device 330 may transmit the results of the analysis of the image data and/or spatial data to the preference analysis machine 310 for determination of fashion preferences of the user 332 and/or for a search of an inventory of fashion items based on the fashion preferences of the user 332.

Any of the machines, databases, or devices shown in FIG. 3 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 18. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 3 may be combined into a single machine, and the functions described herein for any single machine, database, or device may be subdivided among multiple machines, databases, or devices.

The network 390 may be any network that enables communication between or among machines, databases, and devices (e.g., the server machine 310 and the device 330). Accordingly, the network 390 may be a wired network, a wireless network (e.g., a mobile or cellular network), or any suitable combination thereof. The network 390 may include one or more portions that constitute a private network, a public network (e.g., the Internet), or any suitable combination thereof. Accordingly, the network 390 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 390 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 4:
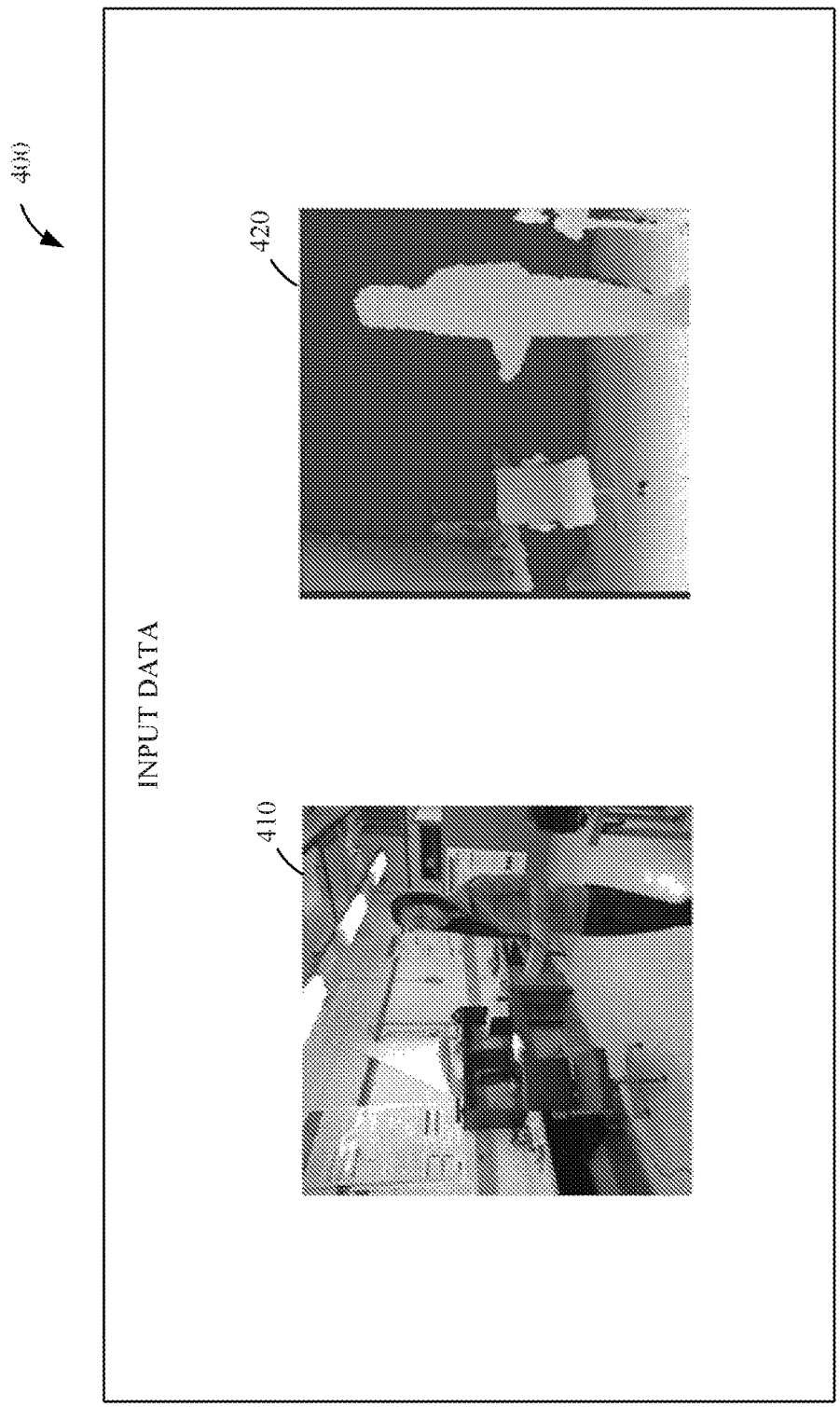
FIG. 4 is a diagram illustrating an example of input data, according to some example embodiments.

FIG. 4 is a diagram illustrating an example of input data, according to some example embodiments. The preference analysis machine 310, using skeletal and depth tracking technology implemented in a depth sensor, may gather spatial data that describes objects located in the physical environment external to the depth sensor (e.g., the user's living room). The skeletal and depth tracking technology may be implemented in a depth sensor (e.g., the Kinect), stereo cameras, mobile devices, and any other device that may capture depth data. In some example embodiments, the skeletal and depth tracking technology is implemented on a server using algorithms that utilize the RGB and depth channels.

In some example embodiments, depth sensing technologies use structured light or time of flight based sensing. For example, an infrared (hereinafter, also "IR") emitter that is part of the preference analysis machine 310 and that is located in the user's living room, may project (e.g., emit or spray out) beams of infrared light into surrounding space. The projected beams of IR light may hit and reflect off objects that are located in their path (e.g., the user or a physical object in the user's living room). A depth sensor (e.g., located in the user's living room) may capture (e.g., receive) spatial data about the surroundings of the depth sensor based on the reflected beams of IR light. In some example embodiments, the captured spatial data may be used to create (e.g., represent, model, or define) a 3D field of view that may be displayed on a screen (e.g., of a TV set, computer, or mobile device). Examples of such spatial data include the location and shape of the objects within the room where the spatial sensor is located.

In some example embodiments, based on measuring how long it takes the beams of IR light to reflect off objects they encounter in their path and be captured by the depth sensor, the preference analysis machine 310 may determine the location (e.g., the distance from the depth sensor) of the objects off which the beams of IR light reflected (e.g., the user, a furniture piece, or a wall). In various example embodiments, based on the received spatial data, the system may determine details of the objects in the room, such as spatial measurements of the objects in the room (e.g., the dimensions of the user's body).

In some example embodiments, the images of the user 332 (e.g., captured by a camera that is included in the device 330) and spatial data collected via the depth sensor 334 over a period of time serve as input data to the preference analysis machine 310. FIG. 4 illustrates an example image 410 (e.g., an RGB image) of the user 332 and example spatial data 420 (e.g., a jet pseudo-colored depth image) that is indicative of the physical environment external to the depth sensor 334. The spatial data 420 includes information about the shape of the body of the user 332, the dimensions of the body of the user 332, the distance between the depth sensor 334 and the user 332, etc. According to certain example embodiments, the preference analysis machine 310 may analyze the input data to determine the user's fashion preferences. The preference analysis machine 310 may also identify fashion items available for purchase that match the user's fashion preferences and the user's body measurements, and may recommend the identified fashion items to the user.

Figure 5:
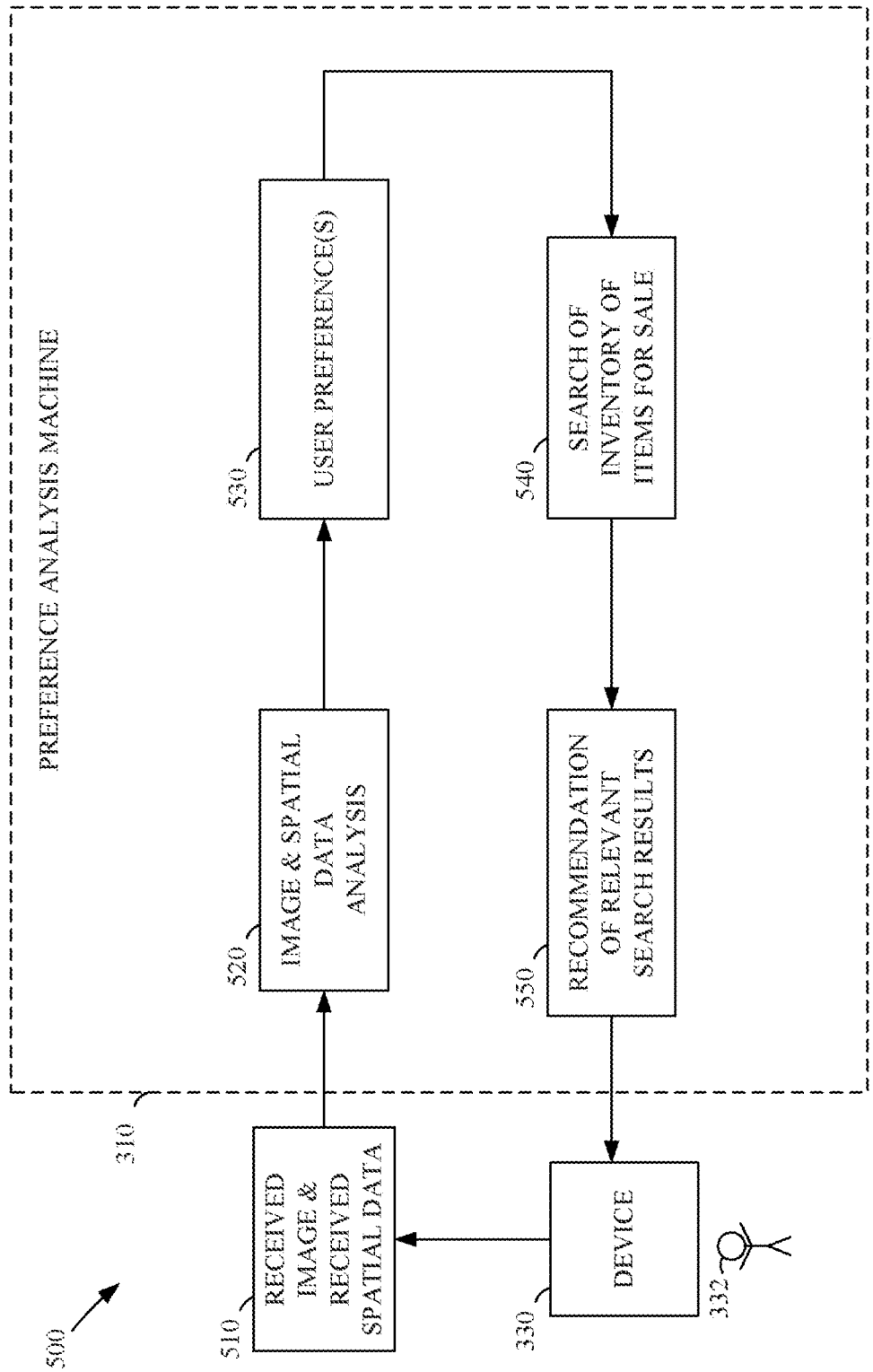
FIG. 5 is a functional diagram of an example preference analysis machine, according to some example embodiments.

FIG. 5 is a functional diagram of an example preference analysis machine 310, according to some example embodiments. In some example embodiments, the preference analysis machine 310 is included in a network-based system 500. As described in more detail below, the preference analysis machine 310 may receive an image and a set of spatial data 510 (e.g., an image of the user 332 and spatial data indicative of the body of the user 332 in the space external to the depth sensor 334). The image and the set of spatial data 510 may be received from the device 330 associated with the user 332. The image and the set of spatial data 510 may be received together at the same time or independently of each other at different times, and from different data capturing devices. In certain example embodiments, the device 330 includes the depth sensor 334.

In response to receiving the image and spatial data 510, the preference analysis machine 310 analyses (e.g., performs an image and spatial data analysis 520 of) the received image and the received set of spatial data 510 (also "the image and the set of spatial data 510") using at least one computer processor. In some example embodiments, to perform the image and spatial data analysis 520, the preference analysis machine 310 generates a model representing the body of the user based on the set of spatial data received at a particular time and determines, based on an analysis of the image and the model, one or more attribute-value pairs that characterize an item worn by the user on a particular body part of the user at the particular time. An attribute of an item worn by the user may be a characteristic of the item, such as a style, color, pattern, brand, fabric, or texture. A value of an attribute is a description that the attribute may take. Examples of attribute-value pairs may be "style: casual", "color: red", or "material: leather."

The preference analysis machine 310 may perform the image and spatial data analysis 520 based on a plurality of images of the user and a plurality of sets of spatial data received at a plurality of times. Accordingly, the preference analysis machine 310 may generate a plurality of models representing the body of the user at the plurality of times, and may determine, based on the analysis of the plurality of image and the plurality of models, one or more attribute-value pairs that characterize each of the items worn by the user on the particular body part at each of the plurality of times.

In certain example embodiments, the preference analysis machine 310 identifies a fashion preference 530 of the user 332 based on a frequency of the user wearing items characterized by a particular attribute-value pair during a period of time. For example, the preference analysis machine 310 may determine how many days in a particular month the user wore shirts characterized by the attribute-value pair "style: casual." In another example, the preference analysis machine 310 may determine how many days in a particular month the user wore shoes characterized by the attribute-value "material: leather."

In some example embodiments, upon identifying the user preference 530 of the user 332, the preference analysis machine 310 performs a search 540 of an inventory of items for sale (e.g., a plurality of listings of items for sale) based on the identified user preference 530. In some instances, the preference analysis machine 310 may perform, based on the user preference 530, a similarity search to identify fashion items that are similar to the items frequently worn by the user 332. In other instances, the preference analysis machine 310 may perform, based on the user preference 530, a coordination search to identify fashion items that may be coordinated with (e.g., worn together with) one or more items worn by the user 332.

The preference analysis machine 310 may, in some example embodiments, generate a recommendation 550 of relevant search results that may include one or more results of the similarity search, coordination search, or both. The preference analysis machine 310 may then transmit a communication that includes the recommendation 550 of relevant search results to the device 330 associated with the user 332.

FIG. 6 is a diagram illustrating example images depicting a user at different points in time and corresponding example models representing the body of the user at the different points in time, according to some example embodiments. The images 610, 630, 650, and 670 shown in FIG. 6 represent a plurality of images of the user 332 that are captured by the device 330 at certain times during a period of time. For example, the images 610, 630, 650, and 670 may be frames from a Kinect video sequence. The images 610, 630, 650, and 670 illustrate the user 332 performing a number of activities (e.g., standing, walking, sitting, exercising, or stretching).

Also shown in FIG. 6 are examples of models 620, 640, 660, and 680 that represent the body of the user 332 in a particular pose corresponding to the images 610, 630, 650, and 670, respectively. Each of the poses seen in the models 620, 640, 660, and 680 reflect a position of the body of the user 332, as illustrated in each of the corresponding images 610, 630, 650, and 670.

In some example embodiments, a model of the body of the user 332 may take the form of a stick figure, as shown in the models 620, 640, 660, and 680 depicted in FIG. 6. The model of the body of the user 332 may include identifiers of the locations of the bone joints of the body of the user 332. The preference analysis machine 310 may identify certain body parts of the user 332 in the model based on the identifiers of the locations of the bone joints of the body of the user 332. Based on the identified body parts in the model, the preference analysis machine 310 may determine user preferences for fashions worn on the respective body parts.

Figure 7:
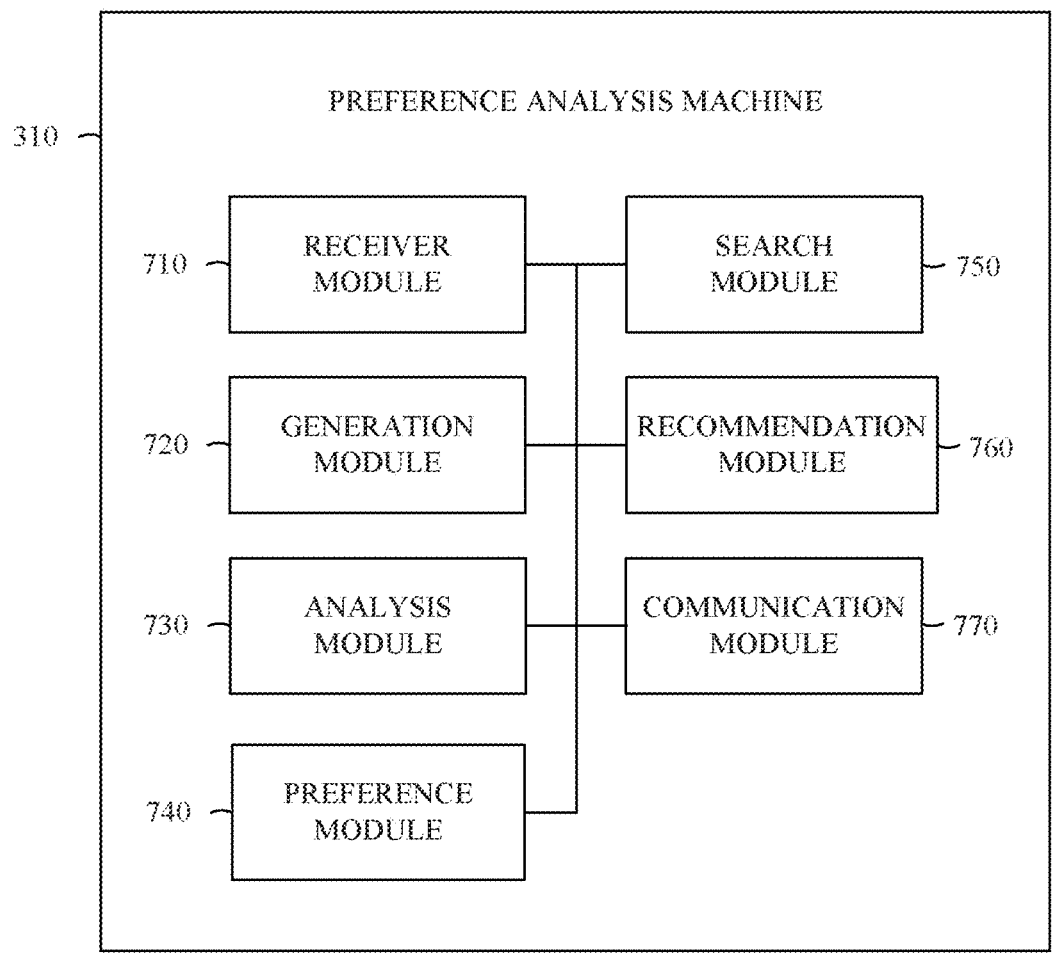
FIG. 7 is a block diagram illustrating components of the preference analysis machine, according to some example embodiments.

FIG. 7 is a block diagram illustrating components of the preference analysis machine 310, according to some example embodiments. The preference analysis machine 310 is shown as including a receiver module 710, a generation module 720, an analysis module 730, a preference module 740, a search module 750, a recommendation module 760, and a communication module 770, all configured to communicate with each other (e.g., via a bus, shared memory, or a switch).

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 8:
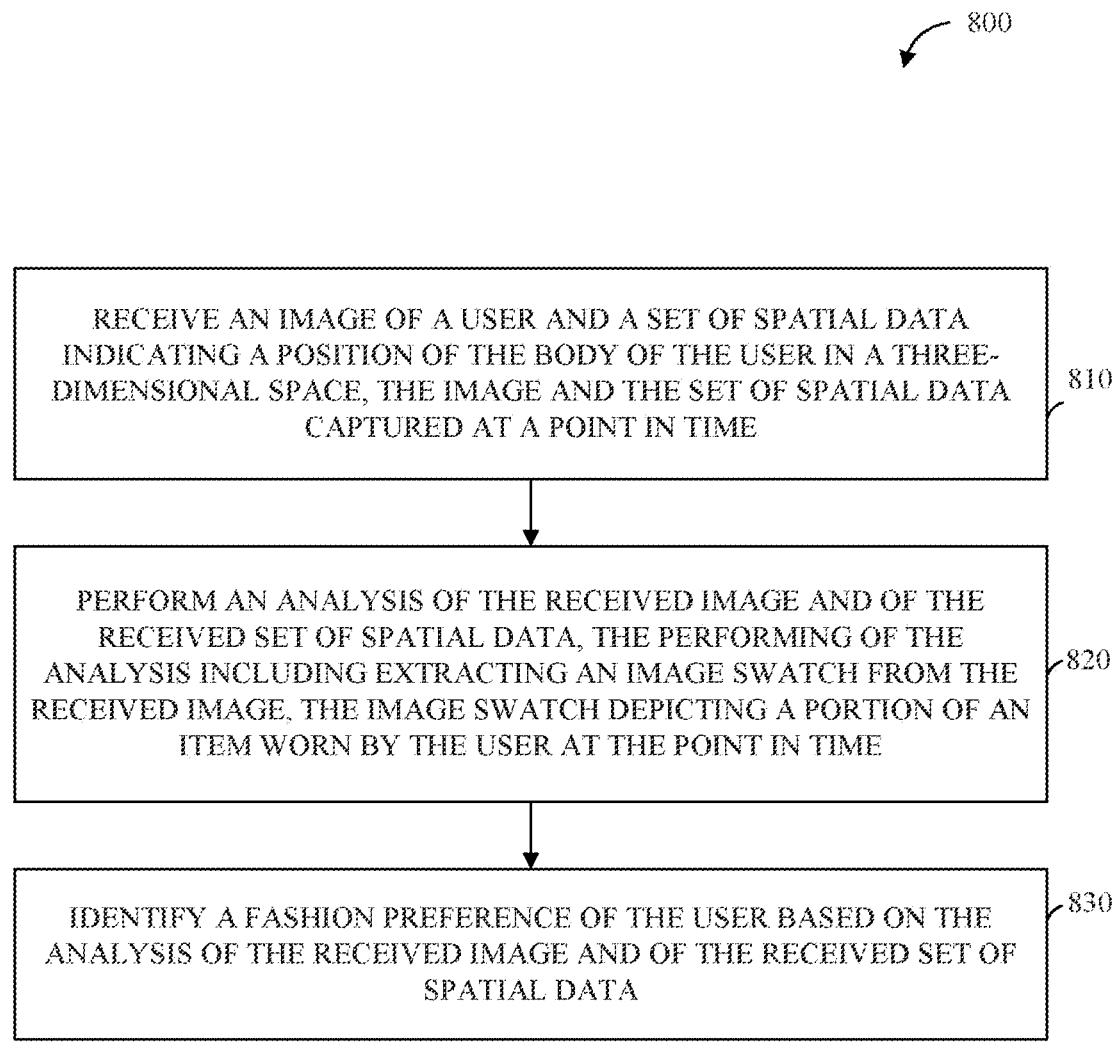
FIGS. 8-9 are flowcharts illustrating operations of the preference analysis machine in performing a method of determining fashion preferences of a user, according to some example embodiments.
Figure 9:
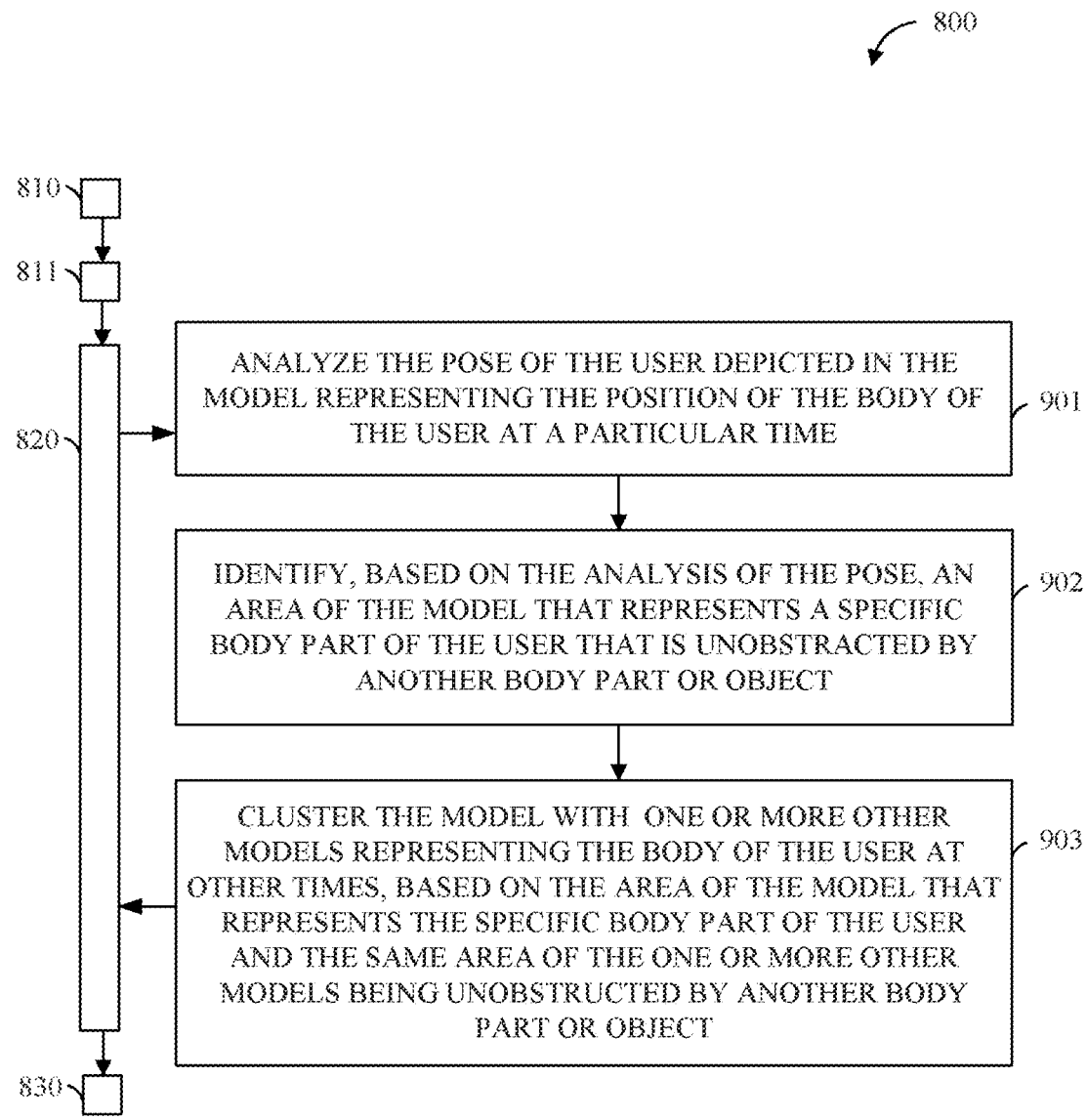
Figure 10:
FIG. 10 is a diagram illustrating examples of model clusters, according to some example embodiments.

FIGS. 8-10 are flowcharts illustrating operations of the preference analysis machine 310 in performing a method 800 of determining fashion preferences of a user and providing fashion item recommendations based on the user's fashion preferences, according to some example embodiments. Operations in the method 800 may be performed using modules described above with respect to FIG. 7. As shown in FIG. 8, the method 800 may include one or more of operations 810, 820, and 830.

At method operation 810, the receiver module 710 accesses (e.g., receives, obtains, or captures) an image of a user and a set of spatial data indicating a position of the user in a three-dimensional space at a particular time (e.g., a point in time). The received image (also "the image") and the received set of spatial data (also "the set of spatial data") may be captured at the particular time. In some example embodiments, the received image and the received set of spatial data are input data received by the receiver module 710 from a device (e.g., the Kinect) associated with the user. The image, the set of spatial data, or both may be captured by a depth sensor which may communicate the image, the set of spatial data, or both to the device associated with the user. In some instances, the depth sensor may bypass the device associated with the user, and may transmit the image, the set of spatial data, or both directly to the preference analysis machine 310 (e.g., to the receiver module 710).

At method operation 820, the analysis module 730 performs, using one or more hardware processors, an analysis of the received image and of the received set of spatial data. The performing of the analysis may include extracting an image swatch from the received image. The image swatch may depict a portion of an item worn by the user at the particular time. The analysis module 730 may store the image swatch in a record of a database (e.g., the database 126).

In some example embodiments, the analysis of the image and the model includes the analysis of an area of the image that corresponds to a particular body part of the user and that depicts a fashion item worn by the user at the particular time. In certain example embodiments, the analysis module 730 determines one or more measurements (e.g., dimensions) of the body of the user as part of the analysis of the image and the model. The analysis module 730 may also determine, based on the measurements of the user's body, one or more sizes of fashion items from different brands (e.g., manufacturers or sellers of fashion items) that may fit the user's body.

At method operation 830, the preference module 730 identifies a fashion preference of the user based on the analysis of the received image and of the received set of spatial data. For example, based on the analysis of the received image and of the received set of spatial data, the analysis module 730 may determine that the user likes to wear shirts made of blue denim fabric. Further details with respect to the method operations of the method 800 are described below with respect to FIGS. 8A-9, 11, and 13-15.

Figure 8A:
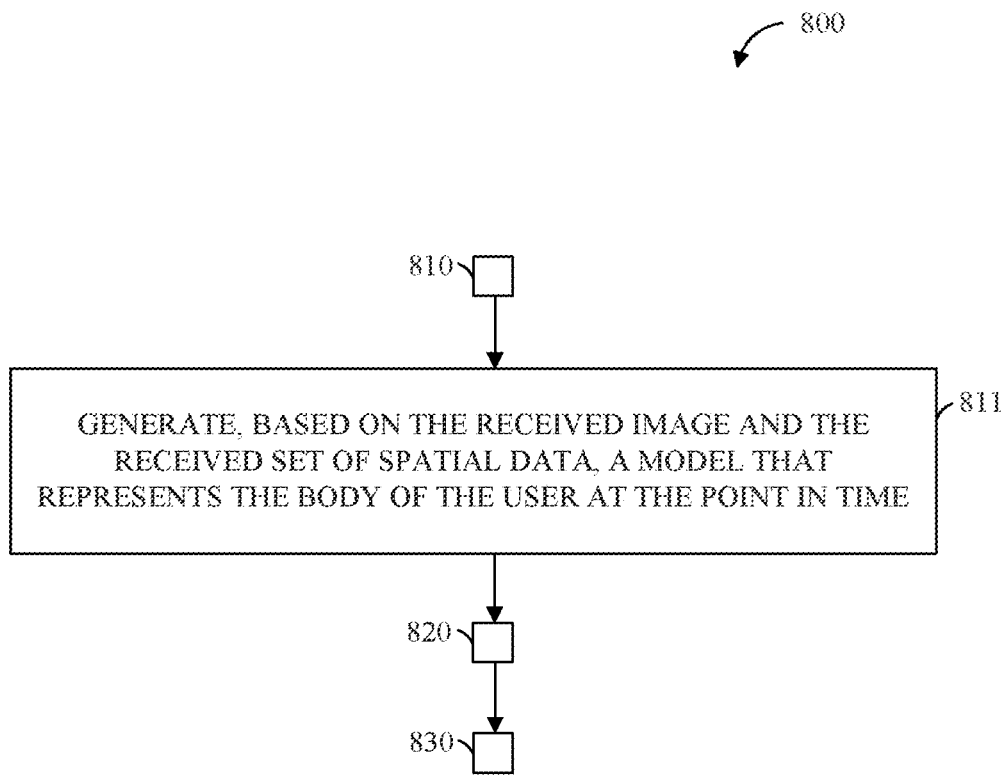

As shown in FIG. 8A, the method 800 may include one or more of operations 811. Method operation 811 may be performed after method operation 810, in which the receiver module 710 receives the image of the user and the set of spatial data indicating the position of the user in a three-dimensional space at a particular time.

At method operation 811, the generation module 720 generates, using one or more processors, a model representing the body of the user at the particular time based on the set of spatial data. In some example embodiments, the model includes a stick figure representing a pose of the user depicted in the image captured at the particular time.

As shown in FIG. 9, the method 800 may include one or more of method operations 901, 902, and 903, according to some example embodiments. Method operation 901 may be performed as part (e.g., a precursor task, a subroutine, or a portion) of method operation 820, in which the analysis module 730 performs an analysis of the received image and of the received set of spatial data. At method operation 901, the analysis module 730 analyzes the pose of the user that is depicted in the model representing the position of the body of the user at the particular time.

Method operation 902 may be performed after method operation 901. At method operation 902, the analysis module 730 identifies, based on the analysis of the pose, an area (e.g., the area that represents the user's torso) of the model that represents a specific body part (e.g., the torso) of the user that is unobstructed by an object (e.g., another body part of the user, an item of furniture, another person, an animal, etc.).

Method operation 903 may be performed after method operation 902. At method operation 903, the analysis module 730 clusters (e.g., groups, generates a cluster of, or generates a group of) the model with one or more other models representing the body of user at other times. The clustering of the models may be based on the area of the model that represents the specific body part of the user and the same area of the one or more other models being unobstructed by another body part or object.

For example, the model is a stick figure representing the position of the user's body at a particular time. The analysis module 730 may cluster stick figures representing the body of the user at different times. The clustering of the stick figures may be based on a similarity in poses of the user's body. For instance, the analysis module 730 may identify stick figures which have torso areas (representing the torso of the user) that are unobstructed by the user's arms or hands. The analysis module 730 may then group the identified stick figures into a cluster. The cluster may map to (e.g., may be identified as illustrating or describing) a particular body part (e.g., the torso) that is unobstructed by another body part or object.

In some example embodiments, a cluster is a library of stick figures that are generated based on image and/or spatial data descriptive of different users at different times. The stick figures clustered in a particular group may be representative of a particular pose taken by the different people. One or more of the pose clusters may map to certain body parts which are unobstructed from view.

According to various example embodiments, instead of or in addition to generating a cluster of models representing the positions of the user's body at a plurality of times, the analysis module 730 generates a cluster of images depicting the user at a plurality of times. In some example embodiments, instead of or in addition to generating a cluster of models or a cluster of images of the user, the analysis module 730 may generate a combination of an image of the user captured at a particular time and the corresponding model representing a pose of the user at the particular time. For instance, the combination of the image and the corresponding model may include an overlaying (e.g., a superimposition) of the model (e.g., a stick figured representing the pose of the user) over the two-dimensional representation of the user's body depicted in the image. The analysis module 730 may cluster the combination of the image and the corresponding model with one or more other combinations of other images and other corresponding models. The analysis module 730 may store one or more clusters (e.g., of models, of images, or of combinations of images and models) in one or more records of a database (e.g., the database 126).

FIG. 10 is a diagram illustrating examples of model clusters, according to some example embodiments. FIG. 10 includes two rows of combinations of images of a user and models representing poses of the user. Each of the two rows represents example clusters 1010 and 1020. The cluster 1010 includes four combinations of images of the user with corresponding models that represent particular positions of the body of the user. Similarly, the cluster 1020 includes four combinations of images of the user with corresponding models that represent particular positions of the body of the user. In each combination of an image and a model within the clusters 1010 and 1020, the model (e.g., a stick figure) may be superimposed on its corresponding image of the user. According to certain example embodiments, the combinations of images and models are clustered together based on the similarity of poses of the user as depicted in the images and represented in the models corresponding to the respective images.

As shown in FIG. 10, the combinations of images and models in the cluster 1010 depict the user standing, with the user's arms raised at or above shoulder level. Accordingly, in some example embodiments, the cluster 1010 may be used for obtaining information about fashions worn by the user on the user's upper body (e.g., based on extracting visual features from an image area that represents the torso of the user) or any other body part that is fully visible within one or more images included in the cluster 1010.

As shown in FIG. 10, the combinations if images and models in the cluster 1020 depict the user standing, with the user's arms or hands partially obstructing the view of the user's torso. For example, as depicted in some of the image of the cluster 1020, the user has the user's arms crossed in front of the user's chest. Accordingly, in some example embodiments, the cluster 1020 may not be used for obtaining information about fashions worn by the user on the user's upper body. However, because the arms and the wrists of the user are closer to the camera in the images of the cluster 1020, the cluster 1020 may be used for obtaining information about fashions worn by the user on the user's arms or the wrists (e.g., based on extracting visual features from an image area that represents the arms or the wrists of the user) or any other body part that is fully visible within one or more images included in the cluster 1020.

FIG. 11 is a flowchart illustrating operations of the preference analysis machine in performing a method 800 of determining fashion preferences of a user, according to some example embodiments. As shown in FIG. 11, the method 800 may include one or more of method operations 1101, 1102, 1103, 1104, and 1105, according to some example embodiments.

Method operation 1101 may be performed as part (e.g., a precursor task, a subroutine, or a portion) of method operation 820, in which the analysis module 730 performs an analysis of the received image and of the received set of spatial data. At method operation 1101, the analysis module 730 obtains (e.g., accesses, receives, selects, or extracts) a model from the cluster of models and the received image corresponding to the model. Alternatively, in some example embodiments, the analysis module 730 obtains a combination of a received image and a corresponding model from a cluster of combinations of received images and corresponding models. The model and the corresponding received image may represent (e.g., describe) a pose of the user at a particular time.

Method operation 1102 may be performed after method operation 1101. At method operation 1102, the analysis module 730 identifies a location in the receive image that corresponds to the model obtained from the cluster. The location corresponds to a particular body part of the user. The identifying of the location corresponding to the particular body part of the user may be based on one or more identifiers of the user's bone joints. The identifiers of the user's bone joints may be included in the model representing the pose of the user at a particular time.

Method operation 1103 may be performed after method operation 1102. At method operation 1103, the analysis module 730 extracts an image swatch (e.g., a portion, an area, a square, a rectangle, or a circle) from the identified location in the image. The image swatch may depict a portion or the entirety of an item worn by the user on the particular body part. In some example embodiments, the analysis module 730 stores the extracted image swatch in a record of a database (e.g., the database 126). The analysis module 730 may perform further analysis of one or more image swatches extracted from one or more received images of the user.

Method operation 1104 may be performed after method operation 1103. At method operation 1104, the analysis module 730 analyzes the image swatch. The analysis of the image swatch, in some example embodiments, includes determining one or more attribute-value pairs that characterize the item worn by the user on the particular body part.

Method operation 1105 may be performed after method operation 1104, in which the analysis module 730 analyzes the image swatch. At method operation 1105, the analysis module 730 determines one or more attribute-value pairs that characterize an item worn by the user on the particular body part of the user. The determining of the one or more attribute-value pairs may be based on the analysis of the image swatch. For example, based on the analysis of an image swatch extracted from the torso area of the user depicted in a received image, the analysis module 730 may determine that the user wore on the user's upper body an item characterized by the attribute-value pair "color: blue" and by the attribute-value pair "fabric: denim."

Figure 12:
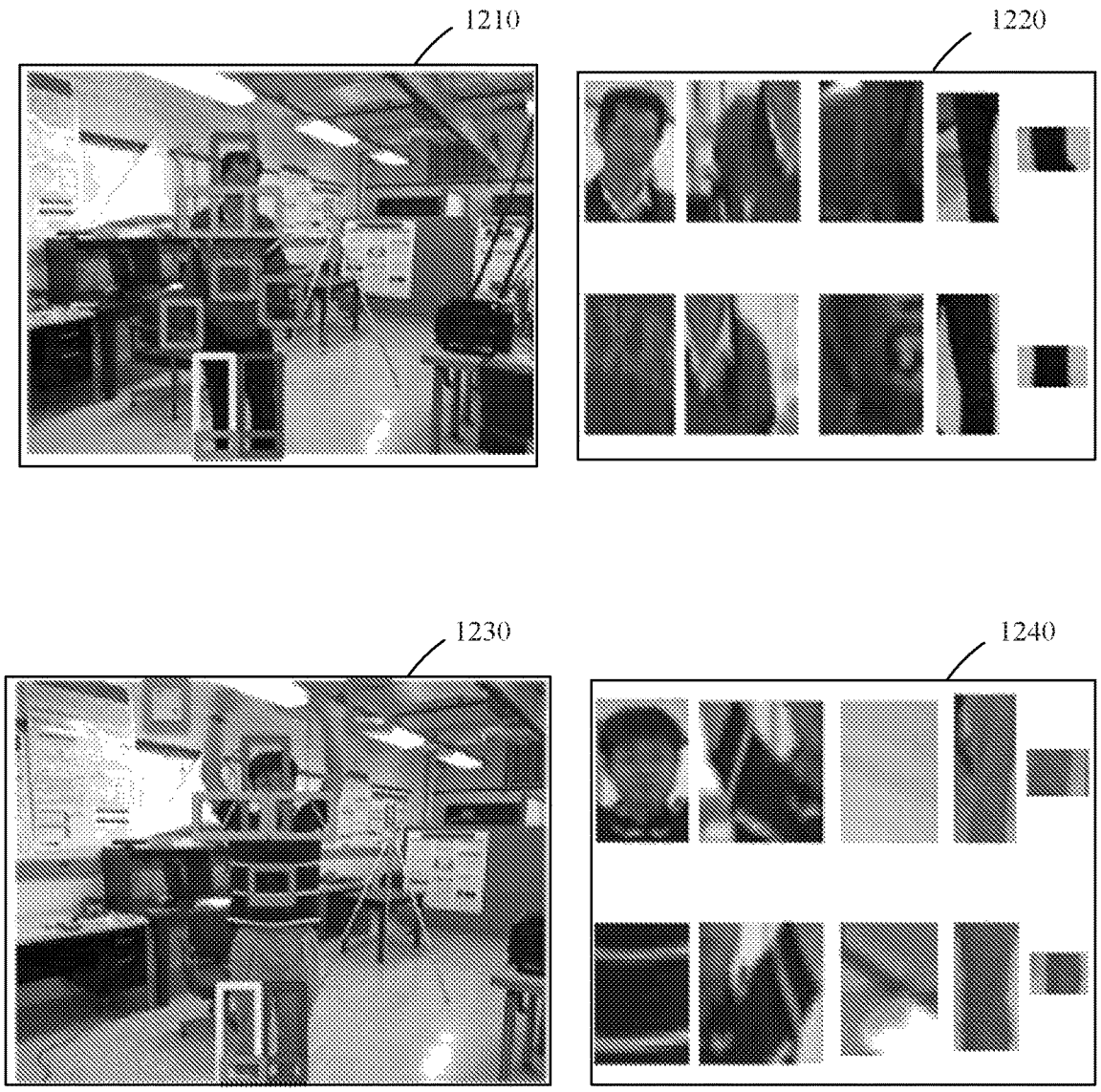
FIG. 12 is a diagram illustrating example images and corresponding example groups of image swatches extracted from the respective example images, according to some example embodiments.

FIG. 12 is a diagram illustrating example images and corresponding example groups of image swatches extracted from the respective example images, according to some example embodiments. As shown in FIG. 12, images 1210 and 1230 may be sample images obtained by the analysis module 730 from different clusters of images of the user. The clusters to which the images 1210 and 1230 belong may represent different poses depicted in the images included in the respective clusters.

During the process of analysis of the image and the model, the analysis module 730 may identify a particular body part of the user that is fully visible (e.g., unobstructed by another body part of object). The analysis module 730 may identify an image area (e.g., a location in the image or a portion of the image) that corresponds to the particular unobstructed body part. For example, as shown in FIG. 12, the analysis module 730 may identify the image area based on overlaying a bounding box around a portion of the image that depicts a part of or the entirety of a particular body part of the user. The analysis module 730 may, in some instances, mark several images areas based on overlaying a plurality of bounding boxes of different colors to identify image portions that depict distinct (e.g., different) body parts of the user. The identified image area(s) may be used to extract image swatches that depict different fashion items worn by the user on different parts of the user's body in the particular image.

The analysis module 730 may extract one or more image swatches from the identified image area(s). For example, as shown in FIG. 12, the analysis module 730 extracts a first image swatch that corresponds to a first image area included within the green bounding box superimposed on the image 1210, in the area of the user's torso. The analysis module 730 may extract a second image swatch that corresponds to a second image area included within the yellow bounding box superimposed on the image 1210, in the area of the user's right leg.

Also shown in FIG. 12 are a group of image swatches 1220 that are extracted from the image 1210 and a group of image swatches 1240 that are extracted from the image 1230. The image swatches in the groups of image swatches 1220 and 1240 may be analyzed to determine attribute-value pairs that characterize items worn by the user on one or more body parts.

Figure 13:
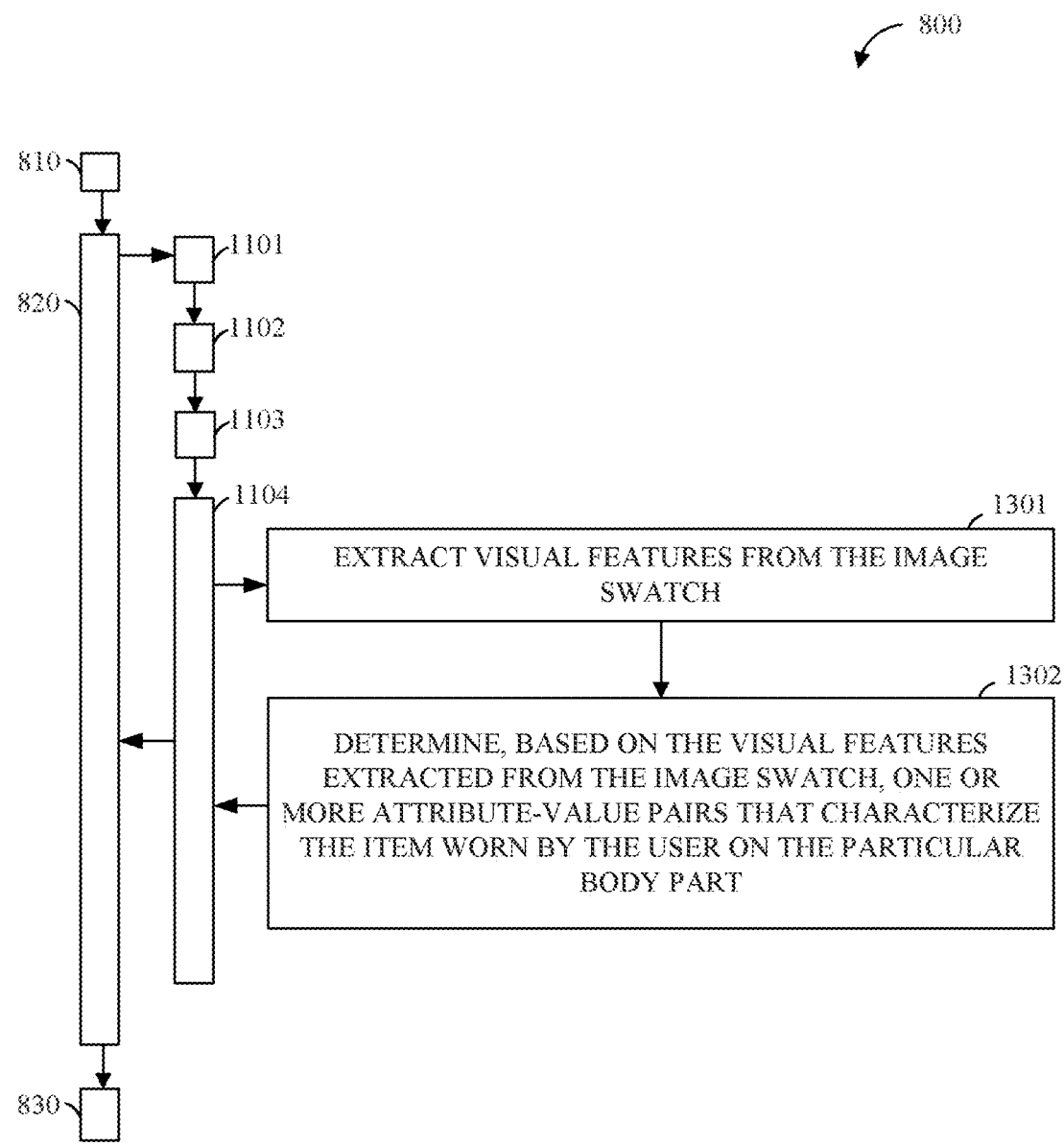
FIGS. 13-15 are flowcharts illustrating operations of the preference analysis machine in performing a method of determining fashion preferences of a user, according to some example embodiments.
Figure 14:
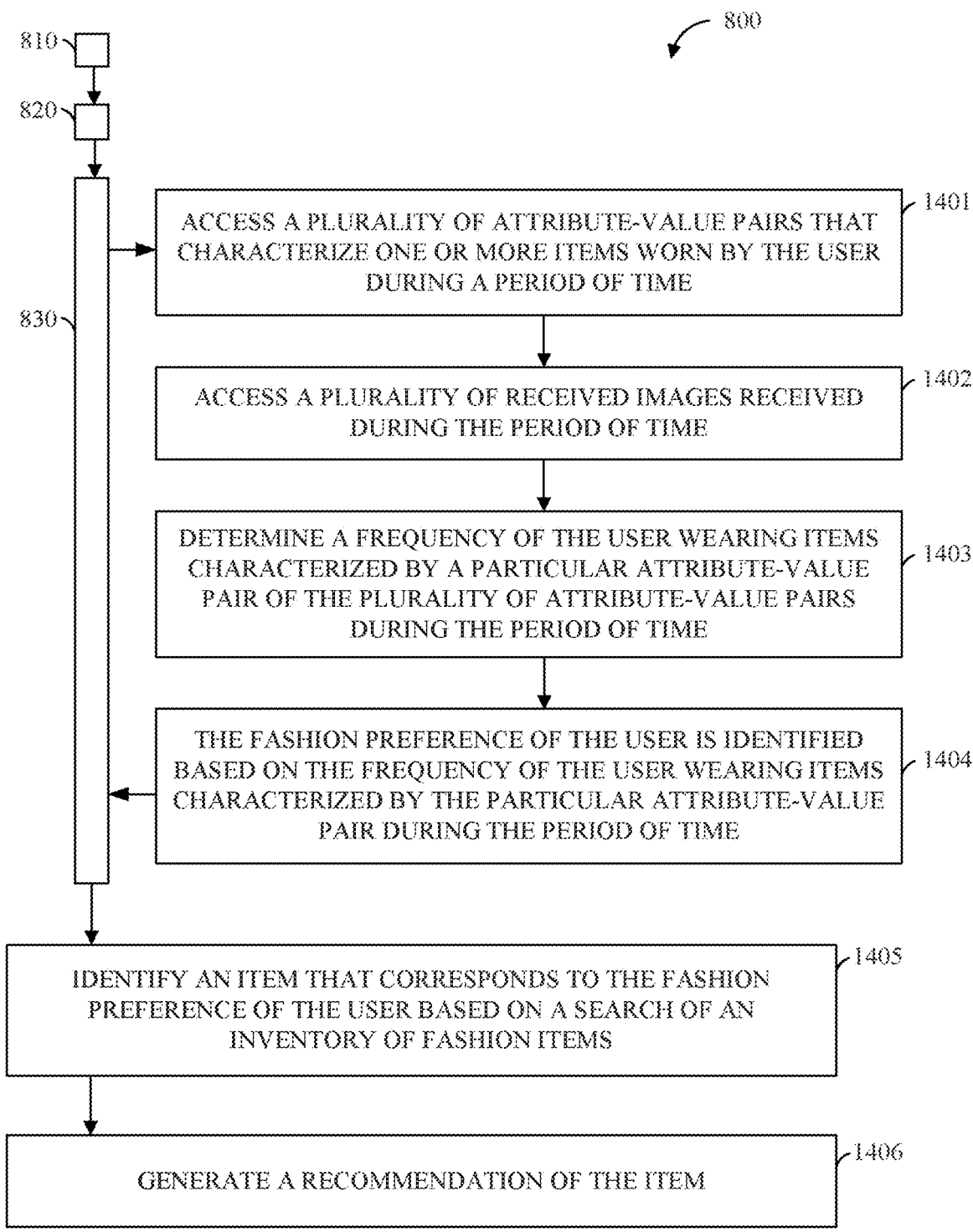
Figure 15:
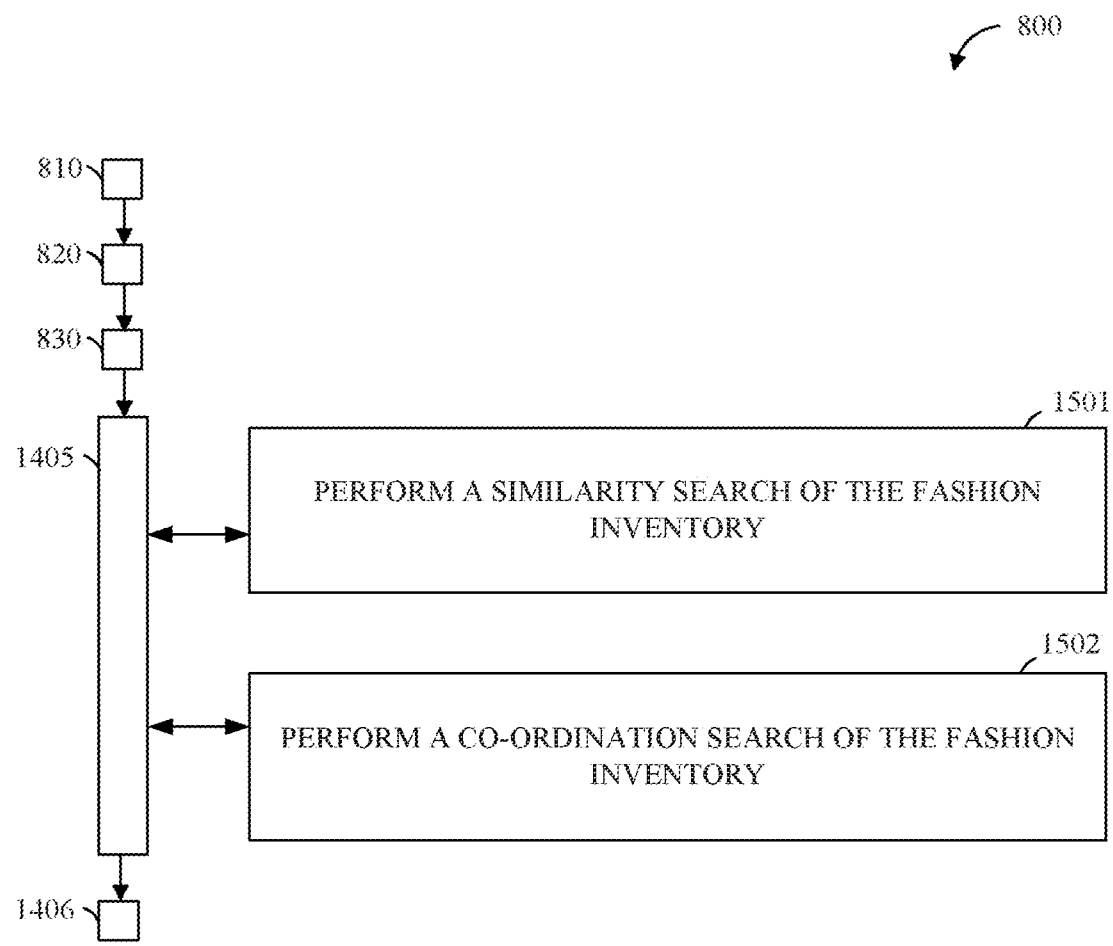

FIGS. 13-15 are flowcharts illustrating operations of the preference analysis machine in performing a method 800 of determining fashion preferences of a user, according to some example embodiments.

As shown in FIG. 13, the method 800 may include one or more of method operations 1301 and 1302, according to some example embodiments. Method operation 1301 may be performed as part (e.g., a precursor task, a subroutine, or a portion) of method operation 1104, in which the analysis module 730 analyzes the image swatch. At method operation 1301, the analysis module 730 extracts one or more visual features from the image swatch.

In some example embodiments, the analysis module 730 stores the one or more visual features extracted from the image swatch, together or in association with an identifier of the image swatch, in a record of a database. The one or more visual features extracted from the image swatch may be used, in some instances, to perform a similarity search of an inventory of fashion items or a coordination search of the inventory of fashion items, or both. For example, in a similarity search, one or more visual features extracted from the image swatch may be compared with one or more visual features identified in an image depicting a fashion item included in the fashion inventory being searched.

Method operation 1302 may be performed after method operation 1302, in which the analysis module 730 extracts one or more visual features from the image swatch. At method operation 1302, the analysis module 730 determines, based on the visual features extracted from the image swatch, one or more attribute-value pars that characterize the item worn by the user on the particular body part.

As shown in FIG. 14, the method 800 may include one or more of method operations 1401, 1402, 1403, 1404, 1405, and 1406 according to some example embodiments. Method operation 1401 may be performed as part (e.g., a precursor task, a subroutine, or a portion) of method operation 830, in which the preference module 730 identifies a fashion preference of the user based on the analysis of the received image and of the received set of spatial data. At method operation 1401, the preference module 740 accesses (e.g., receives) a plurality of attribute-value pairs that characterize one or more items worn by the user during a period of time (e.g., at a plurality of times, such as at 10 a.m. every work day during the month of June).

Method operation 1402 may be performed after the method operation 1401. At method operation 1402, the preference module 740 accesses a plurality of received images received during the period of time.

Method operation 1403 may be performed after the method operation 1403. At method operation 1404, the preference module 740 determines a frequency of the user wearing items characterized by a particular attribute-value pair of the plurality of the attribute-value pairs, during the period of time. The determining of the frequency may be based on the plurality of the received images received during the period of time. The frequency may be represented by a number of days or a number of times the user wore items characterized by a particular attribute-value pair during the period of time.

Method operation 1404 may be performed after the method operation 1403. At method operation 1405, the preference module 740 identifies a fashion preference of the user based on the frequency of the user wearing items characterized by the particular attribute-value pair during the period of time.

In some example embodiments, the preference module 740 may compare the number of days of a period of time that the user wore items characterized by a particular attribute-value pair with a threshold number of days. If the number of days of a period of time that the user wore items characterized by the particular attribute-value pair exceeds the threshold number of days, the preference module 740 identifies the particular attribute-value pair as representing a fashion preference of the user. In some instances, the fashion preference of the user is stored in a record of the database 126 as a general fashion preference of the user (e.g., the user likes the color blue or the user likes to wear denim). In other instances, the preference of the user is stored in a record of the database 126 as a fashion preference of the user associated with an identifier of a type of fashion item to which the preference pertains (e.g., tops, bottoms, footwear, purses, hats, ties, jewelry, etc.).

For example, the preference module 740 may determine that the user wore fashion items on the user's upper body that are characterized by the attribute-value pair "color: blue" twenty days out of the last thirty days. The threshold number of days is eighteen days out of thirty days. The preference module 740 may determine that, because the user wore blue-colored clothing on the user's upper body for more than eighteen days out of the last thirty days, the number of days that the user wore items characterized by the attribute-value pair "color: blue" exceeds the threshold number of days. Accordingly, the preference module 740 may identify the attribute-value pair "color: blue" as a fashion preference of the user.

Method operation 1405 may be performed after method operation 830, in which the preference module 730 identifies a fashion preference of the user based on the analysis of the received image and of the received set of spatial data. At method operation 1405, the search module 750 identifies an item that corresponds to the fashion preference of the user based on (e.g., as part of) a search of an inventory of fashion items. The preference module 730 may perform a search of the inventory of fashion items based on the identified fashion preference of the user. The inventory of fashion items may include items available for purchase on a network-based marketplace.

In some example embodiments, the identifying of the item that corresponds to the fashion preference of the user includes performing of a search of the inventory of fashion items based on the image swatch. The performing of the search may include comparing, according to a particular search rule, the image swatch and one or more images depicting fashion items within the inventory.

In some example embodiments, the identifying of the item that corresponds to the fashion preference of the user includes performing of a search of the inventory of fashion items based on one or more attribute-value pairs that characterize the item worn by the user on a particular body part of the user. The one or more attribute-value pairs may be determined based on visual features extracted from the image swatch.

In some example embodiments, the search module 750 may limit the search to a particular category of items. For example, the search module 750 searches for an item identified (e.g., with an identifier or a tag included in the metadata of an item listing or of an image of the item) as worn by people of a particular gender (e.g., female or male) or age (e.g., children or adults). According to another example, the search module 750 searches for an item included in a particular category of fashion items (e.g., tops, bottoms, hats, footwear, jewelry, etc.).

Method operation 1406 may be performed after method operation 1405. At method operation 1406, the recommendation module 760 generates a recommendation of the item identified during the search of the fashion inventory as corresponding to the fashion preference of the user.

In some example embodiments, the method 800 may further comprise transmitting (e.g., by the communication module 770) a communication to the user. The communication may include the generated recommendation of the item identified as corresponding to the fashion preference of the user.

As shown in FIG. 15, the method 800 may include one or more of method operations 1501 and 1502, according to some example embodiments. Method operation 1501 may be performed as part (e.g., a precursor task, a subroutine, or a portion) of method operation 1405, in which the search module 750 performs a search of an inventory of fashion items based on the identified fashion preference of the user. At method 1501, the search module 750 performs a similarity search of the fashion inventory and generates similarity search results (e.g., fashion items that are similar to an item previously worn by the user).

In some example embodiments, the similarity search is based on an image swatch. In some instances, the similarity search is also based on one or more measurements of the user's body. The performing of the similarity search may include selecting (e.g., by the search module 750) an extracted image swatch to be used as a query image swatch and matching the query image swatch to one or more images of items in the fashion inventory.

In some instances, the search module 750 performs a similarity search of an inventory of fashion items based on one or more visual features extracted from the image swatch. For example, to perform a similarity search, the search module 750 compares one or more visual features extracted from the image swatch and one or more visual features identified in an image depicting a fashion item included in the fashion inventory being searched.

In some example embodiments, the similarity search is based on an attribute-value pair that characterizes a fashion item previously worn by the user. In some instances, the similarity search is also based on one or more measurements of the user's body. The performing of the similarity search may include selecting (e.g., by the search module 750) an attribute-value pair to be used as a query attribute-value pair and identifying one or more items in the fashion inventory that are characterized by the attribute-value pair.

Method operation 1502 may be performed as part (e.g., a precursor task, a subroutine, or a portion) of method operation 1405, in which the search module 750 performs a search of an inventory of fashion items based on the identified fashion preference of the user. At method 1502, the search module 750 performs a coordination search of the fashion inventory and generates coordination search results (e.g., fashion items that can be coordinated with an item previously worn by the user).

In some example embodiments, the coordination search is based on an image swatch. In some instances, the coordination search is also based on one or more measurements of the user's body. The performing of the coordination search may include selecting (e.g., by the search module 750) an extracted image swatch to be used as a query image swatch and identifying, based on a coordination rule, one or more items in the fashion inventory that can be worn together with the fashion item that corresponds to the query image swatch.

In some instances, the search module 750 perform a coordination search of an inventory of fashion items based on one or more visual features extracted from the image swatch. For example, to perform a coordination search, the search module 750 may compare one or more visual features extracted from the image swatch and one or more visual features identified in an image depicting a fashion item included in the fashion inventory being searched.

In some instances, one or more coordination rules that specify what items can be worn together are generated based on an analysis of a plurality of images of one or more users, that are captured over a period of time. The one or more coordination rules may be stored in one or more records of a database (e.g., the database 126) in association with identifiers of one or more users.

In some example embodiments, the coordination search is based on an attribute-value pair that characterizes a fashion item previously worn by the user. In some instances, the coordination search is also based on one or more measurements of the user's body. The performing of the coordination search may include selecting (e.g., by the search module 750) an attribute-value pair to be used as a query attribute-value pair and identifying, based on a coordination rule, one or more items in the fashion inventory that can be worn together with the fashion item previously worn by the user and that is characterized by the attribute-value pair.

Figure 16:
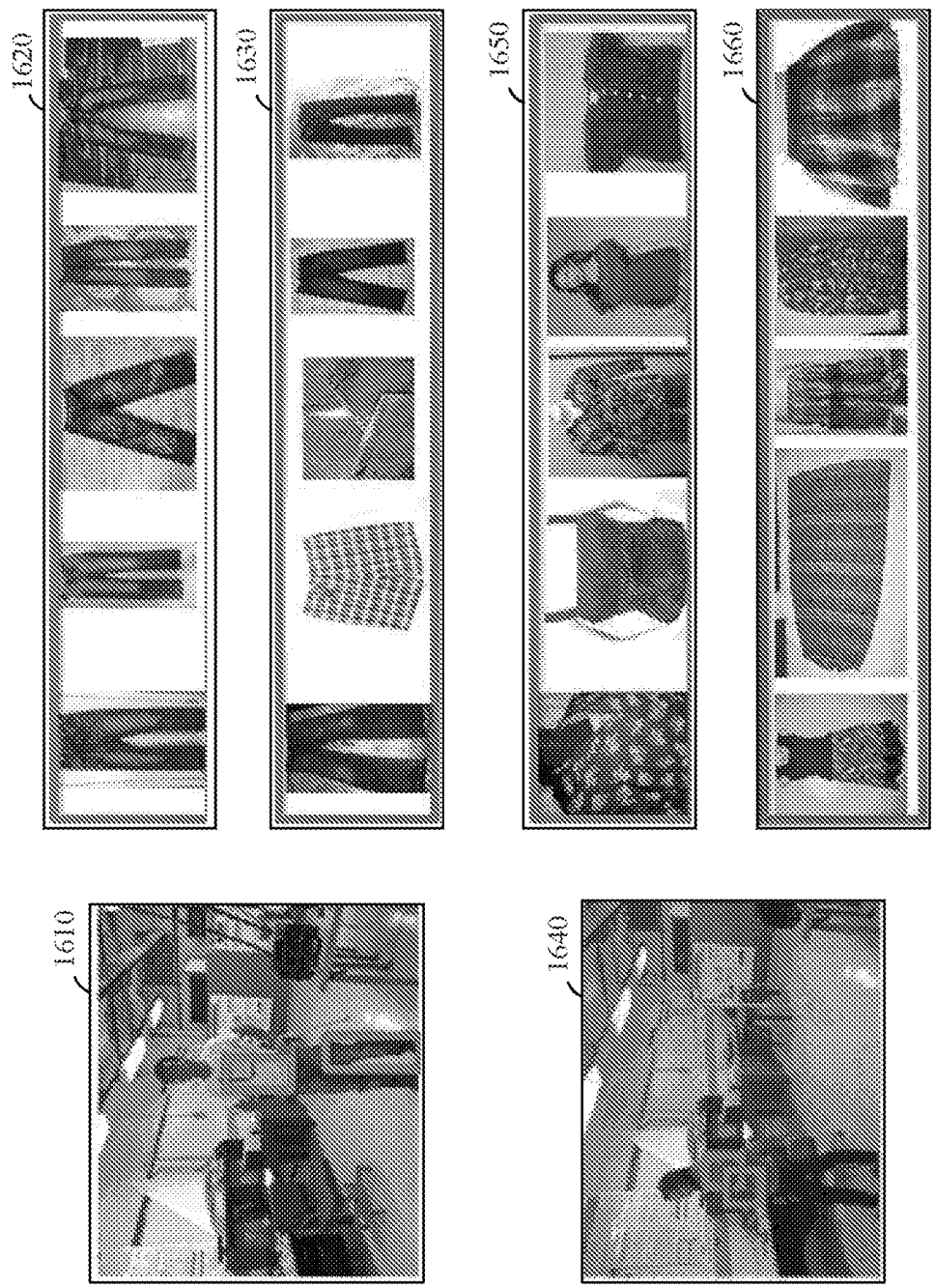
FIG. 16 is a diagram illustrating example query images and corresponding example search results, according to some example embodiments.

FIG. 16 is a diagram illustrating example images including query image swatches and corresponding example search results, according to some example embodiments. As shown in FIG. 16, the image 1610 may be used to extract two image swatches: a first image swatch marked by a red bounding box overlaid on (e.g., enclosing) a portion of the user's jeans depicted in the image 1610 and a second image swatch marked by a green bounding box overlaid on (e.g., enclosing) a portion of the user's white t-shirt depicted in the image 1610.

The search module 750 may perform a similarity search based on the first image swatch extracted from the image 1610. Based on the similarity search, the search module 750 may generate one or more similarity search results 1620. The search module 750 may perform a coordination search based on the second image swatch extracted from the image 1610. Based on the coordination search, the search module 750 may generate one or more coordination search results 1630.

Similarly, the search module 750 may perform a similarity search based on the first image swatch extracted from the image 1640. Based on the similarity search, the search module 750 may generate one or more similarity search results 1650. The search module 750 may perform a coordination search based on the second image swatch extracted from the image 1640. Based on the coordination search, the search module 750 may generate one or more coordination search results 1660.

According to various example embodiments, one or more of the methodologies described herein may facilitate the determination of fashion preferences of users. Moreover, one or more of the methodologies described herein may facilitate the providing of item recommendations to the users based on the users' fashion preferences. Hence, one or more the methodologies described herein may facilitate improving sales of the items recommended to the users.

When these effects are considered in aggregate, one or more of the methodologies described herein may obviate a need for certain efforts or resources that otherwise would be involved in evaluating images of items for sale online. Efforts expended by a provider of such images (e.g., the seller) in evaluating such images may be reduced by one or more of the methodologies described herein. Computing resources used by one or more machines, databases, or devices (e.g., within the network environment 300) may similarly be reduced. Examples of such computing resources include processor cycles, network traffic, memory usage, data storage capacity, power consumption, and cooling capacity.

Example Mobile Device

Figure 17:
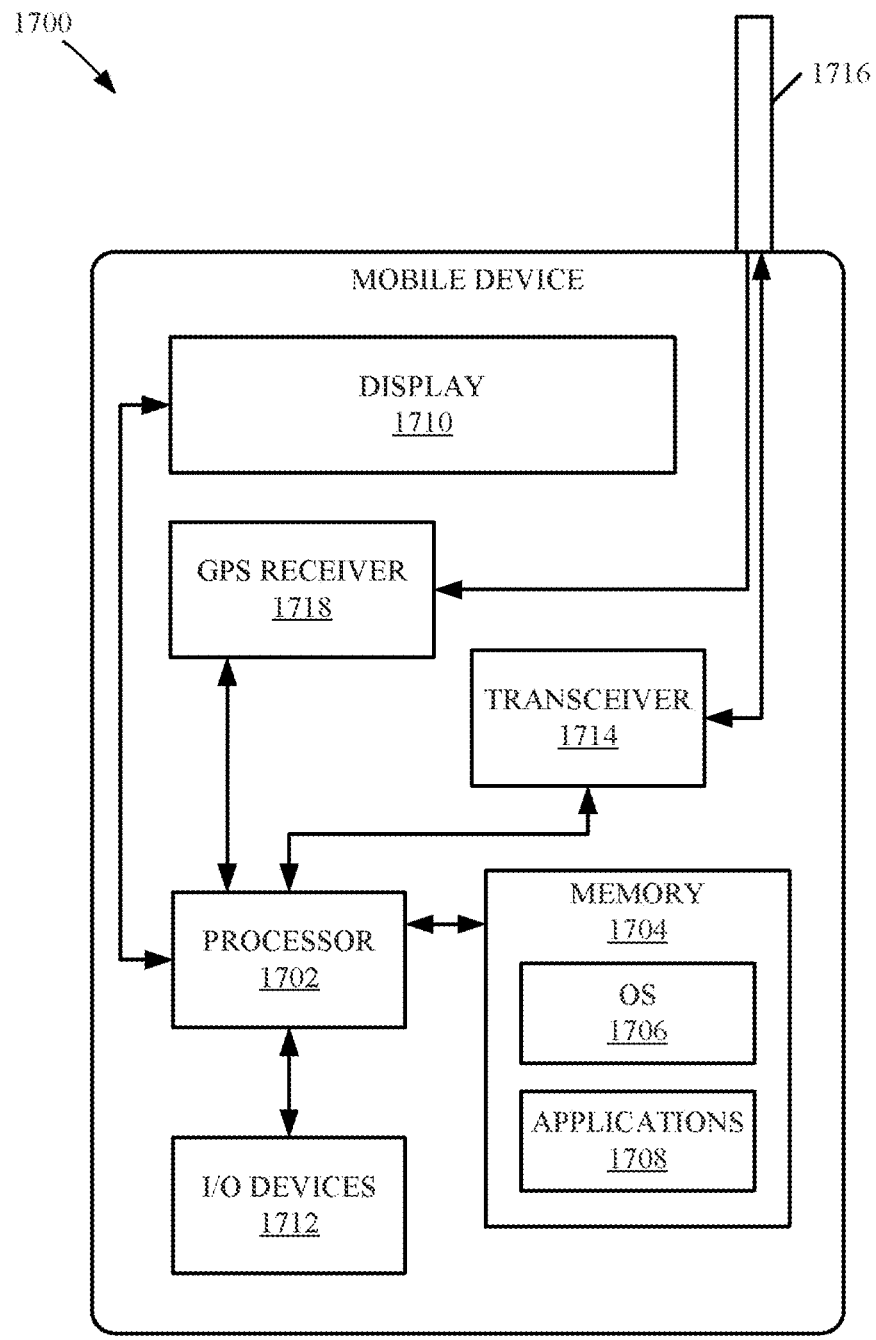
FIG. 17 is a block diagram illustrating a mobile device, according to some example embodiments.

FIG. 17 is a block diagram illustrating a mobile device 1700, according to an example embodiment. The mobile device 1700 may include a processor 1702. The processor 1702 may be any of a variety of different types of commercially available processors 1702 suitable for mobile devices 1700 (for example, an XScale architecture microprocessor, a microprocessor without interlocked pipeline stages (MIPS) architecture processor, or another type of processor 1702). A memory 1704, such as a random access memory (RAM), a flash memory, or other type of memory, is typically accessible to the processor 1702. The memory 1704 may be adapted to store an operating system (OS) 1706, as well as application programs 1708, such as a mobile location enabled application that may provide LBSs to a user. The processor 1702 may be coupled, either directly or via appropriate intermediary hardware, to a display 1710 and to one or more input/output (I/O) devices 1712, such as a keypad, a touch panel sensor, a microphone, and the like. Similarly, in some embodiments, the processor 1702 may be coupled to a transceiver 1714 that interfaces with an antenna 1716. The transceiver 1714 may be configured to both transmit and receive cellular network signals, wireless data signals, or other types of signals via the antenna 1716, depending on the nature of the mobile device 1700. Further, in some configurations, a GPS receiver 1718 may also make use of the antenna 1716 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors 1702 may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor 1702 or other programmable processor 1702) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 1702 configured using software, the general-purpose processor 1702 may be configured as respective different hardware-implemented modules at different times. Software may accordingly configure a processor 1702, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 1702 that are temporarily configured (e.g., by software) or permanently configured to perform the relevant operations. Whether temporarily or permanently configured, such processors 1702 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 1702 or processor-implemented modules. The performance of certain of the operations may be distributed among the one or more processors 1702 or processor-implemented modules, not only residing within a single machine, but deployed across a number of machines. In some example embodiments, the one or more processors 1702 or processor-implemented modules may be located in a single location (e.g., within a home environment, an office environment or as a server farm), while in other embodiments the one or more processors 1702 or processor-implemented modules may be distributed across a number of locations.

The one or more processors 1702 may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 1702, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 1702 executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor 1702), or a combination of permanently and temporarily configured hardware may be a design choice. Below are set out hardware (e.g., machine) and software architectures that may be deployed, in various example embodiments.

Example Machine Architecture and Machine-Readable Medium

Figure 18:
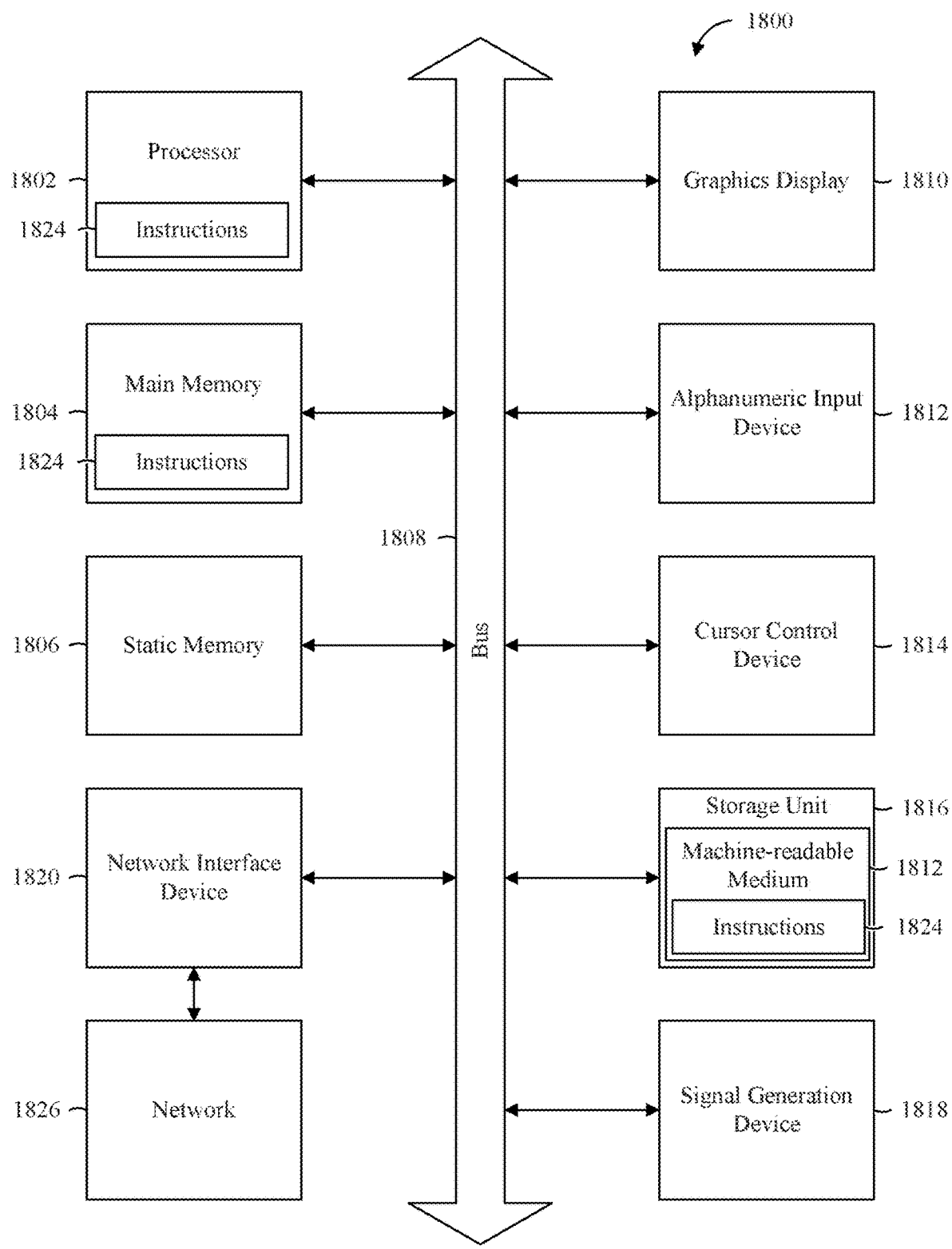
FIG. 18 is a block diagram illustrating components of a machine, according to some example embodiments, able to read instructions from a machine-readable medium and perform any one or more of the methodologies discussed herein.

FIG. 18 is a block diagram illustrating components of a machine 1800, according to some example embodiments, able to read instructions 1824 from a machine-readable medium 1822 (e.g., a non-transitory machine-readable medium, a machine-readable storage medium, a computer-readable storage medium, or any suitable combination thereof) and perform any one or more of the methodologies discussed herein, in whole or in part. Specifically, FIG. 18 shows the machine 1800 in the example form of a computer system (e.g., a computer) within which the instructions 1824 (e.g., software, a program, an application, an applet, an app, or other executable code) for causing the machine 1800 to perform any one or more of the methodologies discussed herein may be executed, in whole or in part.

In alternative embodiments, the machine 1800 operates as a standalone device or may be connected (e.g., networked) to other machines. In a networked deployment, the machine 1800 may operate in the capacity of a server machine or a client machine in a server-client network environment, or as a peer machine in a distributed (e.g., peer-to-peer) network environment. The machine 1800 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1824, sequentially or otherwise, that specify actions to be taken by that machine. Further, while only a single machine is illustrated, the term "machine" shall also be taken to include any collection of machines that individually or jointly execute the instructions 1824 to perform all or part of any one or more of the methodologies discussed herein.

The machine 1800 includes a processor 1802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1804, and a static memory 1806, which are configured to communicate with each other via a bus 1808. The processor 1802 may contain microcircuits that are configurable, temporarily or permanently, by some or all of the instructions 1824 such that the processor 1802 is configurable to perform any one or more of the methodologies described herein, in whole or in part. For example, a set of one or more microcircuits of the processor 1802 may be configurable to execute one or more modules (e.g., software modules) described herein.

The machine 1800 may further include a graphics display 1810 (e.g., a plasma display panel (PDP), a light emitting diode (LED) display, a liquid crystal display (LCD), a projector, a cathode ray tube (CRT), or any other display capable of displaying graphics or video). The machine 1800 may also include an alphanumeric input device 1812 (e.g., a keyboard or keypad), a cursor control device 1814 (e.g., a mouse, a touchpad, a trackball, a joystick, a motion sensor, an eye tracking device, or other pointing instrument), a storage unit 1816, an audio generation device 1818 (e.g., a sound card, an amplifier, a speaker, a headphone jack, or any suitable combination thereof), and a network interface device 1820.

The storage unit 1816 includes the machine-readable medium 1822 (e.g., a tangible and non-transitory machine-readable storage medium) on which are stored the instructions 1824 embodying any one or more of the methodologies or functions described herein. The instructions 1824 may also reside, completely or at least partially, within the main memory 1804, within the processor 1802 (e.g., within the processor's cache memory), or both, before or during execution thereof by the machine 1800. Accordingly, the main memory 1804 and the processor 1802 may be considered machine-readable media (e.g., tangible and non-transitory machine-readable media). The instructions 1824 may be transmitted or received over the network 1826 via the network interface device 1820. For example, the network interface device 1820 may communicate the instructions

1824 using any one or more transfer protocols (e.g., hypertext transfer protocol (HTTP)).

In some example embodiments, the machine 1800 may be a portable computing device, such as a smart phone or tablet computer, and have one or more additional input components 1830 (e.g., sensors or gauges). Examples of such input components 1830 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1824 for execution by the machine 1800, such that the instructions 1824, when executed by one or more processors of the machine 1800 (e.g., processor 1802), cause the machine 1800 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   receiving an image of a body of a user, the image captured at a point in time;
   performing, by one or more hardware processors, an analysis of the image, the analysis comprising superimposing multiple bounding boxes over portions of the image and extracting multiple image swatches from the image based on the multiple bounding boxes, the multiple image swatches depicting one or more body parts of the user and one or more visual features of one or more items worn by the user on the one or more body parts at the point in time;
   scoring, by the one or more hardware processors, the multiple image swatches based on body part enclosure metrics determined for the multiple image swatches;
   identifying, based on the one or more visual features and the scoring of the multiple image swatches, one or more fashion items having one or more pre-identified visual features that match at least one of the one or more visual features of the one or more items worn by the user, the one or more fashion items from an inventory of fashion items stored in a database record; and
   transmitting a communication to a device associated with the user, the communication including an indication of the one or more fashion items.

2. The method of claim 1, wherein the identifying further comprises identifying the one or more fashion items having a number of the one or more pre-identified visual features that match at least one of the one or more visual features of the one or more items worn by the user, wherein the number exceeds a threshold value.

3. The method of claim 1, further comprising:
   identifying, based on the multiple image swatches and from the inventory of fashion items, a coordinating fashion item that coordinates with the one or more items worn by the user as defined by one or more coordination rules.

4. The method of claim 1, further comprising:
   receiving a set of spatial data indicating shape and/or dimension data of the body, the set of spatial data captured at the point in time;
   wherein identifying the one or more fashion items is further based on the shape and/or dimension data of the body.

5. The method of claim 4, further comprising:
   generating, based on the image and the set of spatial data, a model of the user that represents the body of the user and the one or more items worn by the user.

6. The method of claim 5, further comprising:
   determining, based on an analysis of the one or more items worn by the user and the model, an attribute-value pair that characterizes the one or more items worn by the user;
   wherein identifying the one or more fashion items is further based on the one or more fashion items characterized by the attribute-value pair of the one or more items worn by the user.

7. The method of claim 1, further comprising:
   determining an attribute-value pair that characterizes the one or more items worn by the user;

wherein identifying the one or more fashion items is further based on the one or more fashion items characterized by the attribute-value pair of at least one item worn by the user.

8. A system comprising:
a storage device storing instructions; and
a hardware processor, the instructions, when executed by the hardware processor, cause the system to perform operations comprising:
receiving an image of a body of a user, the image captured at a point in time;
performing an analysis of the image, the analysis comprising superimposing multiple bounding boxes over portions of the image and extracting multiple image swatches from the image based on the multiple bounding boxes, the multiple image swatches depicting one or more body parts of the user and one or more visual features of one or more items worn by the user on the one or more body parts at the point in time;
scoring the multiple image swatches based on body part enclosure metrics determined for the multiple image swatches;
identifying, based on the one or more visual features and the scoring of the multiple image swatches, one or more fashion items having one or more pre-identified visual features that match at least one of the one or more visual features of the one or more items worn by the user, the one or more fashion items from an inventory of fashion items stored in a database record; and
transmitting a communication to a device associated with the user, the communication including an indication of the one or more fashion items.

9. The system of claim 8, wherein the identifying further comprises identifying the one or more fashion items having a number of the one or more pre-identified visual features that match at least one of the one or more visual features of the one or more items worn by the user, wherein the number exceeds a threshold value.

10. The system of claim 8, wherein the operations further comprise:
identifying, based on the multiple image swatches and from the inventory of fashion items, a coordinating fashion item that coordinates with the one or more items worn by the user as defined by one or more coordination rules.

11. The system of claim 8, wherein the operations further comprise:
receiving a set of spatial data indicating shape and/or dimension data of the body, the set of spatial data captured at the point in time;
wherein identifying the one or more fashion items is further based on the shape and/or dimension data of the body.

12. The system of claim 11, wherein the operations further comprise:
generating, based on the image and the set of spatial data, a model of the user that represents the body of the user and the one or more items worn by the user.

13. The system of claim 12, wherein the operations further comprise:
determining, based on an analysis of the one or more items worn by the user and the model, an attribute-value pair that characterizes the one or more items worn by the user;
wherein identifying the one or more fashion items is further based on the one or more fashion items characterized by the attribute-value pair of the one or more items worn by the user.

14. The system of claim 8, wherein the operations further comprise:
determining an attribute-value pair that characterizes the one or more items worn by the user;
wherein identifying the one or more fashion items is further based on the one or more fashion items characterized by the attribute-value pair of the one or more items worn by the user.

15. A non-transitory machine-readable storage medium storing instructions that, when executed by one or more hardware processors, cause the one or more hardware processors to perform operations comprising:
receiving an image of a body of a user, the image captured at a point in time;
performing an analysis of the image, the analysis comprising superimposing multiple bounding boxes over portions of the image and extracting multiple image swatches from the image based on the multiple bounding boxes, the multiple image swatches depicting one or more body parts of the user and one or more visual features of one or more items worn by the user on the one or more body parts at the point in time;
scoring the multiple image swatches based on body part enclosure metrics determined for the multiple image swatches;
identifying, based on the one or more visual features and the scoring of the multiple image swatches, one or more fashion items having one or more pre-identified visual features that match at least one of the one or more visual features of the one or more items worn by the user, the one or more fashion items from an inventory of fashion items stored in a database record; and
transmitting a communication to a device associated with the user, the communication including an indication of the one or more fashion items.

* * * * *